(12) United States Patent
Miyazaki

(10) Patent No.: US 7,365,780 B1
(45) Date of Patent: Apr. 29, 2008

(54) IMAGE PICKUP APPARATUS FOR PRODUCING A DESIRED FRAME OF IMAGE SIGNALS

(75) Inventor: Takao Miyazaki, Asaka (JP)

(73) Assignee: Fujifilm Corporation, Kanagawa (JP)

( * ) Notice: Subject to any disclaimer, the term of this patent is extended or adjusted under 35 U.S.C. 154(b) by 798 days.

(21) Appl. No.: 09/656,995

(22) Filed: Sep. 7, 2000

(30) Foreign Application Priority Data

Sep. 14, 1999 (JP) .................................. 11-259867

(51) Int. Cl.
  *H04N 5/76* (2006.01)
  *H04N 5/235* (2006.01)
(52) U.S. Cl. .................................... 348/231.6; 348/362
(58) Field of Classification Search ........... 348/231.99, 348/231.6, 231.1, 231.9, 221.1
  See application file for complete search history.

(56) References Cited

U.S. PATENT DOCUMENTS

| | | | |
|---|---|---|---|
| 5,272,498 A * | 12/1993 | Wakabayashi | 396/320 |
| 5,576,759 A * | 11/1996 | Kawamura et al. | 348/207.99 |
| 6,359,649 B1 * | 3/2002 | Suzuki | 348/220.1 |
| 6,518,999 B1 * | 2/2003 | Miyamoto | 348/220.1 |
| 6,533,976 B1 * | 3/2003 | Strasser et al. | 264/87 |
| 6,549,232 B1 * | 4/2003 | Taniguchi et al. | 348/231.99 |
| 6,734,910 B1 * | 5/2004 | Yumoto et al. | 348/333.12 |
| 2002/0057352 A1 * | 5/2002 | Yamagishi | 348/231.6 |

FOREIGN PATENT DOCUMENTS

| | | |
|---|---|---|
| JP | 64-042639 | 2/1989 |
| JP | 01-277829 | 11/1989 |
| JP | A9205605 | 8/1997 |
| JP | 10-257370 A | 9/1998 |
| JP | 11-088761 | 3/1999 |
| JP | 11-220638 A | 8/1999 |

OTHER PUBLICATIONS

Sony Corporation, Digital Still Camera DSC-F1. pp. 18-19, 1996.

* cited by examiner

*Primary Examiner*—David Ometz
*Assistant Examiner*—Luong T. Nguyen
(74) *Attorney, Agent, or Firm*—Birch, Stewart, Kolasch & Birch, LLP

(57) ABSTRACT

An image pickup apparatus capable of outputting one of successive pictures that is picked up at a desired timing. When the operator of the apparatus selects a continuous shoot mode, sets a mode dial at a "Pre (prior)/Post (posterior)" position, and then presses a release button to a half-stroke position, the apparatus picks up a desired scene at preselected intervals. Up to nine latest frames of image data are written to a main memory while being sequentially updated. Subsequently, when the operator presses the release button to a full-stroke position, up to five additional latest frames of image data are written to the main memory. The image data stored in the main memory are read out and transformed to display data. The display data appear on an LCD (Liquid Crystal Display) panel in a multiframe format. When the operator, watching pictures appearing on the LCD panel, selects desired one of the pictures by operating preselected switches arranged on an operation panel, the image data representative of the above picture is recorded in an external memory removably mounted to the apparatus.

18 Claims, 22 Drawing Sheets

IMAGE PICKUP APPARATUS FOR PRODUCING A DESIRED FRAME OF IMAGE SIGNALS

BACKGROUND OF THE INVENTION

1. Field of the Invention

The present invention relates to an image pickup apparatus for picking up a scene with an image sensor and storing the resulting image signal. More particularly, the present invention relates to an image pickup apparatus capable of picking up a plurality of successive pictures in a continuous shoot mode.

2. Description of the Background Art

A digital still camera extensively used today uses a CCD (Charge Coupled Device) image sensor or similar solid-state image sensor in place of the traditional silver halide photosensitive type of film. This kind of camera is capable of storing image data output from the image sensor in a semiconductor memory or similar storage and reproducing it on a monitor in the form of a picture. This allows the operator of the camera, watching the monitor, to confirm the result of a shot immediately after the shot. However, it is not easy for the operator to determine a shutter chance while focusing the camera on a desired subject and selecting the range of a shot at the same time, and then pick up the scene at a desired timing. For example, the operator is apt to miss a shutter chance due to the delay of operator's decision or action or the delay of operation particular to the camera. This brings about a release time lag between the intended time for shooting and the time of the actual shot.

In light of the above, Japanese patent laid-open publication No. 205605/1997 discloses an image pickup system including an image pickup apparatus and a computer connected to each other. Image data generated by the image pickup apparatus earlier than the input of a shoot command by a period of time corresponding to the release time lag is input to the computer. The system measures a release time lag particular to the operator of the apparatus and includes a memory capable of storing image data to be picked up over the time lag. When the operator operates a shutter release button of the camera, image data representative of the oldest picture existing in an image buffer of the camera is displayed and written to an auxiliary memory.

The release time lag, however, depends on the person to operate the image pickup apparatus. The prior art system, therefore, must measure the time lag every time the person to operate the camera or the shooting conditions change. Moreover, even the picture taken with due consideration given to the release time lag is not always a picture picked up at a desired timing or shutter chance.

To allow the operator of a digital still camera to surely take a picture at a desired timing, the camera may be constructed to continuously pick up a desired scene while sequentially recording the resulting successive pictures in a memory in the same manner as a movie camera. However, simply picking up successive pictures and storing the whole data representative of the pictures not only wastes the limited capacity of the memory, but also increases processing loads. This makes it difficult to implement a digital camera capable of producing high-quality still pictures.

SUMMARY OF THE INVENTION

It is therefore an object of the present invention to provide an image pickup apparatus capable of surely outputting a picture picked up at a desired timing.

An image pickup apparatus of the present invention includes an image sensor for picking up a scene in accordance with a control signal to thereby output an image signal representative of the scene, and a storage for storing a plurality of frames of image signals. A selecting device allows the operator of the apparatus to select desired one of the frames of image signals stored in the storage. Outputting circuitry reads the one frame of image signal selected by the operator out of the storage and outputs the one frame of image signal. A controller outputs the above control signal that causes the image sensor to pick up the scene at preselected intervals. The storage stores latest ones of frames of image signals picked up at the preselected intervals while sequentially updating them. The controller causes the storage to hold frames of image signals picked up during a period of time that is based on the operation of a release button. The selecting device allows the operator to select any one of the frames of image signals held in the storage.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
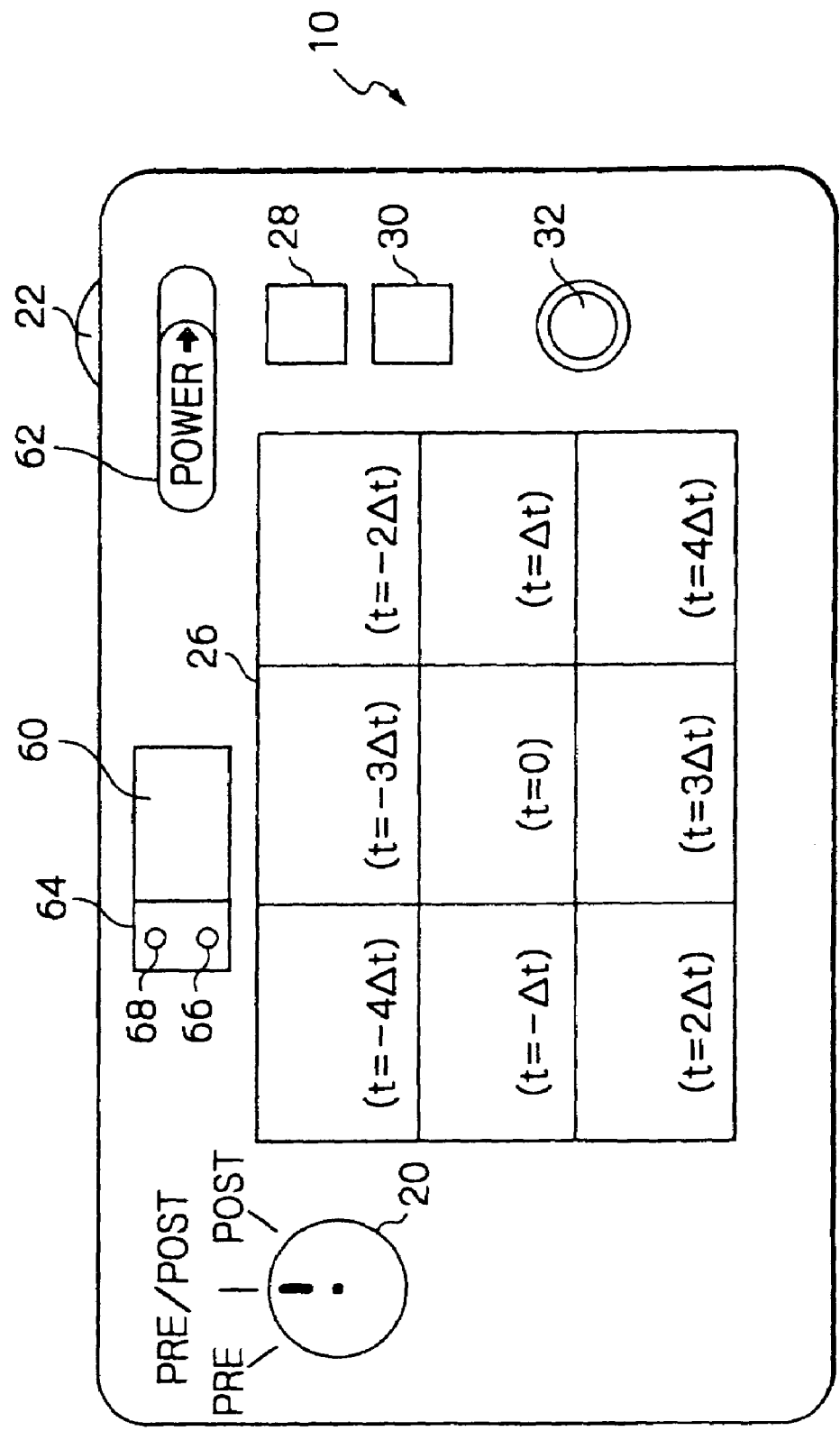
FIG. 1 is an external view showing a digital camera embodying the present invention.
Figure 2:
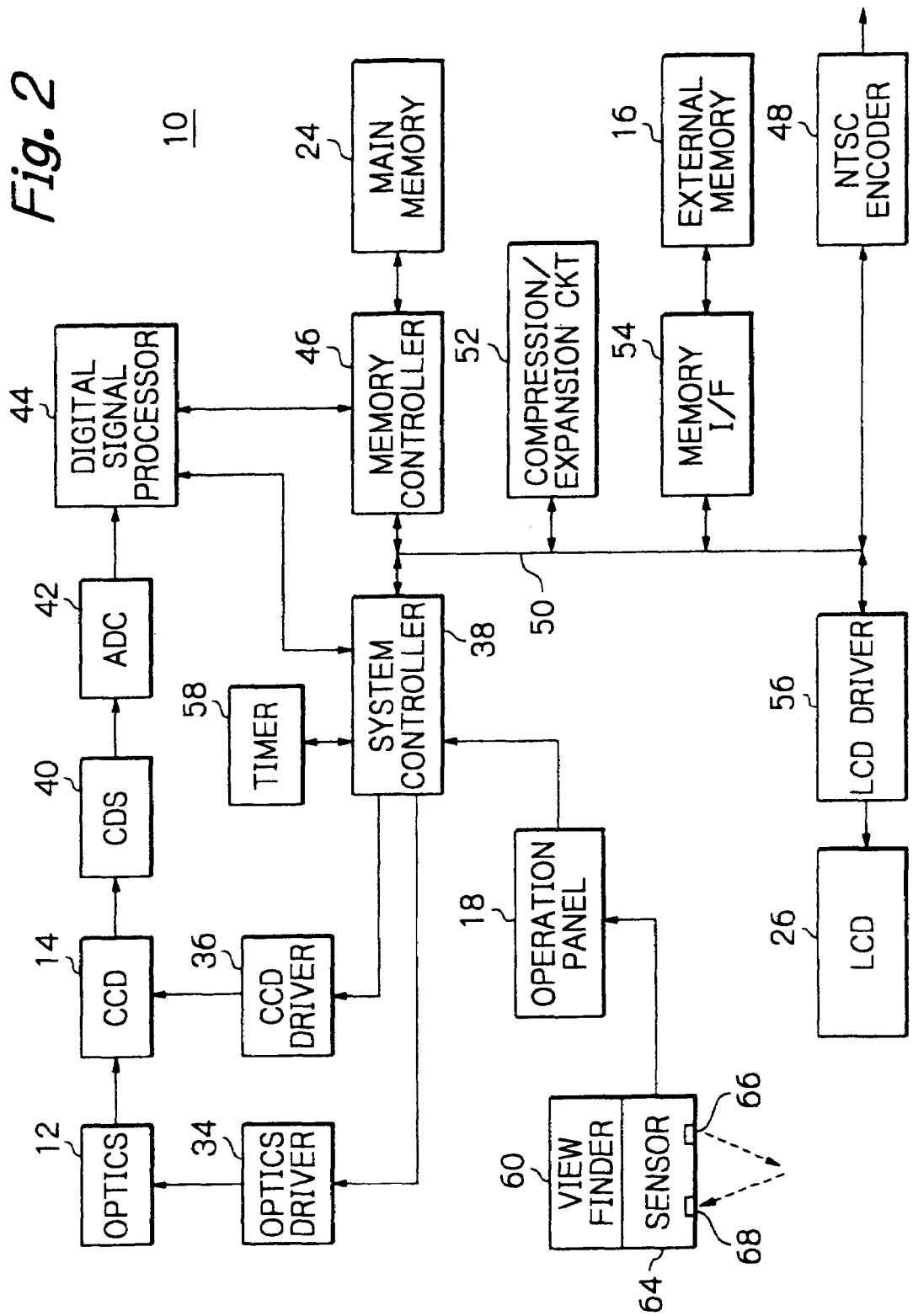
FIG. 2 is a block diagram schematically showing a specific circuit configuration of the illustrative embodiment.

Referring to FIG. 2 of the drawings, an image pickup apparatus embodying the present invention is shown and implemented as a digital camera by way of example. As shown, the digital camera, generally 10, includes a CCD image sensor 14 to which an optical image representative of a scene to be picked up is incident via optics 12. An image signal output from the image sensor 14 is processed and then written to an external memory 16 removably mounted to the camera 10. An operation panel 18 includes a release button 22 (see FIG. 1). When the operator of the camera 10 presses the release button 22, a release switch, not shown, is operative in response to cause the camera 10 to pick up the scene and execute store processing in accordance with a mode selected by the operator on a single/continuous shoot mode dial, not shown, of the camera.

For example, assume that the operator selects a continuous shoot mode on the shoot mode dial and then sets a mode dial 20 (see FIG. 1) assigned to the continuous shoot mode at its "Pre" position. Then, when the operator presses the release button 22 to its half-stroke position, the camera 10 sequentially stores a plurality of successive frames of image data in a main memory 24 while sequentially updating them. After the operator has pressed the release button 22 to its full-stroke position, the camera 10 allows the operator to designate desired one of the frames of image data stored in the main memory 24 and records the designated frame of image data in the external memory 16.

When the operator sets the mode dial 20 at its "Pre/Post" position and then presses the release button 22 to the half-stroke position, the camera 10 executes the same procedure as when the operator sets the dial 20 at the "Pre" position. Subsequently, when the operator presses the release button 22 to the full-stroke position, the camera 10 further-picks up a preselected number of additional frames while storing the resulting image data in the main memory 24. The camera 10 then allows the operator to select desired one of the frames of image data stored in the main memory 24 and records the designated frame in the removable memory 16. Further, assume that the operator sets the mode dial 20 at its "Post" position. Then, the camera starts picking up a preselected number of successive frames when the operator presses the release button 22 to the full-stroke position, while storing the resulting image data in the main memory 24. This also allows the operator to select desired one of the frames stored in the main memory 24.

As stated above, in the continuous shoot mode, the camera 10 picks up a plurality of frames and stores them in the main memory 24 in a particular manner determined by the mode elected on the mode dial 20 and the half-stroke position of the release button 22. At the same time, the camera 10 displays the successive frames or pictures picked up at consecutive times on an LCD (Liquid Crystal Display) panel or monitor 26 (see FIG. 1) in a multiframe format. The operator, watching the LCD panel 26, selects desired one of the frames on an "F (forward)" switch 28, a "B (backward)" switch 30, and an enter/store switch 32. In response, the camera 10 writes image data representative of the frame selected by the operator in the external memory 16.

Assume that the operator selects a single shoot mode on the previously mentioned single/continuous shoot mode dial. Then, the camera 10 picks up a single frame when the operator presses the release button 22 to the full-stroke position, and stores the resulting image data in the external memory 16.

Referring again to FIG. 2, the optics 12 includes a lens system, an orifice diaphragm, and a mechanical shutter although not shown specifically. In response to drive signals fed from an optics driver 34, the optics 34 adjusts the focal position of the lens and the opening of the orifice diaphragm and opens and closes the mechanical shutter. In the illustrative embodiment, the camera 10 controls a shutter speed, i.e., an exposure time at the time of a shot by controlling the mechanical shutter and an electronic shutter available with the CCD image sensor 14.

The CCD image sensor, or bidimensional image sensor, 14 has photosensitive devices, not shown, arranged horizontally and vertically thereon. A color filter, not shown, is positioned in front of the photosensitive devices and made up of primary color filter segments R (red), G (green) and B (blue) corresponding one-to-one to the photosensitive devices. The photosensitive devices each generate a signal charge corresponding to a quantity of light incident thereto via the color filter. The signal charges are transferred from the photosensitive devices to vertical transfer paths and then to a single horizontal transfer path of the image sensor. As a result, R, G and B pixel signals are output from the image sensor 14 in accordance with the filter arrangement. A CCD driver 36 delivers a pixel clock, a transfer clock and other drive signals to the image sensor 14 in order to drive it under the control of a system controller 38.

The output of the CCD image sensor 14 is connected to a CDS (Correlated Double Sampling) circuit 40. The CDS circuit 40 is an analog preprocessing circuit for preamplifying the input pixel signals to a preselected level while canceling reset noise contained in the pixel signals. The preprocessed pixel signals are fed from the CDS circuit 40 to an ADC (Analog-to-Digital Converter) 42. The ADC 42 converts the levels of the input pixel signals to R, G and B image data represented by ten or twelve bits and feeds the image data to a digital signal processing circuit 44.

The digital signal processing circuit 44 executes gamma correction with the R, G and B image data in order to correct the tonality and levels thereof. In addition, the signal processor 44 adjusts the white balance of the image data. The processed image data are delivered from the signal processor 44 to a memory controller 46. When R, G and B image data stored in the main memory 24 are to be transferred to the removable memory 16 or when they are to be fed to an NTSC (National Television System Committee) encoder 48, the signal processor 44 transforms the R, G and B image data to Y (luminance) and C (chrominance) image data. The Y and C image data are input to the memory controller 46.

Further, the digital signal processor 44 transforms the image data output from the ADC 42 or the main memory 24 to display data capable of being displayed on the LCD panel 26 and delivers them via the memory controller 46 and a bus 50 to an LCD driver 56. The LCD driver 56 causes the LCD panel 26 to display a picture represented by the display data. Therefore, at the preparatory stage for a shot, the LCD panel 26 is capable of displaying pictures read out of the external memory 16 or moving pictures being picked up before the operation of the release button 22, as needed. This allows the operator to manually adjust the angle of field, focus, brightness and so forth while watching the moving pictures. In this manner, in the illustrative embodiment, the LCD panel 26 plays the role of an electronic viewfinder for displaying a scene to be picked up beforehand in addition to the role of a display for displaying pictures read out of either one of the main memory 24 and external memory 16.

Moreover, the digital signal processor 44 converts the image size of image data picked up to the display size of the LCD panel 26. For example, assume that the operator selects the continuous shoot mode and continuously picks up a plurality of frames at preselected intervals of $\Delta t$. Then, the signal processor 44 arranges consecutive pictures represented by the resulting image data horizontally and vertically and generates data for causing the LCD panel 26 to display, e.g., nine pictures in a reduced scale. In the "Pre/Post" continuous shoot mode, the signal processor 44 processes successive frames of image data picked up and written to the main memory 24 at consecutive times $t=-4 \Delta t$, $-3 \Delta t, \ldots, 3 \Delta t, 4 \Delta t$ and causes the LCD panel 26 to display pictures represented by the processed image data in a multiframe format. FIG. 1 shows a specific arrangement of pictures continuously picked up at the times $t=-4 \Delta t$ through $t=4 \Delta t$ and appearing on the LCD panel 26.

In the "Pre" continuous shoot mode, the digital signal processor 44 processes consecutive frames of image data picked up at times $t=-8 \Delta t, -7 \Delta t, \ldots, -\Delta t, t=0$ so as to generate data for displaying the above frames together in a reduced scale. Likewise, in the "Post" continuous shoot mode, the signal processor 44 processes consecutive frames of image data picked up at times $t=0, -\Delta t, \ldots, 7 \Delta t, 8 \Delta t$ so as to generate data for displaying such frames together in a reduced scale.

The system controller 38 delivers to the digital signal processor 44 a control signal for allowing the operator to select desired one of the pictures appearing on the LCD panel 26. In response, the signal processor 44 changes the color and brightness of framework of the individual picture in order to distinguish pictures that can be selected from the other pictures.

Another function assigned to the digital signal processor 44 is calculating, based on the image data output from the ADC 42, various estimated values for the adjustment of focus, brightness and other shooting conditions. Specifically, the signal processor 44 divides a frame into sixty-four blocks and calculates estimated values on the basis of block-by-block image data. For example, the signal processor 44 calculates the level of image data block by block by addition and then calculates the photometric value of the scene in accordance with the resulting sums and a photometry mode. The signal processor 44 sends the photometric value to the system controller 38. The system controller 38 generates, based on the photometric data, control signals indicative of a lens opening and a shutter releasing period of time to be assigned to the optics 12 and delivers the control signals to the optics driver 34. In addition, the system controller 38 feeds a control signal indicative of an electronic shutter speed to be assigned to the CCD image sensor 14 to the CCD driver 36. In this sense, the system controller 38 has an automatic exposure adjusting function.

Still another function assigned to the digital signal processor 44 is shifting the focal position of the lens in order to separate the contrast components of the scene from the block-by-block image data, calculating estimated contrast values, and generating a control signal for locating the lens at a position where the estimated contrast value is greatest (automatic focusing function). In addition, when the system controller 38 specifies an AWB (Auto White Balance) mode, the signal processor 44 determines the condition of a light source included in the scene, i.e., color temperature and adjusts the color balance of the RGB signals in matching relation to the color temperature (AWB adjusting function).

The memory controller 46 interchanges image data with the signal processor 44 and controls the writing and reading of image data out of the main memory 24 (store control function). Further, the memory controller 46 controls data transfer between the various functional blocks connected to the bus 50 in response to control signals output from the system controller 38. In the illustrative embodiment, the main memory 24 is capable of storing nine frames of image data picked up. The memory controller 46 feeds an address signal and a write control signal to the main memory 24.

When the operator sets the mode dial 20 at the "Pre" position or the "Pre/Post" position, the memory controller 46 writes, in response to a control signal fed from the system controller 38, nine consecutive frames of image data sequentially picked up at the intervals of $\Delta t$ in the main memory 24. When another frame of image data is input, the memory controller 46 deletes the oldest image data existing in the main memory 24 and writes the latest frame of image data in the resulting unoccupied area of the memory 24. In this manner, the memory controller 46 cyclically writes the latest image data in the main memory 24 while deleting the oldest image data.

Assume that the operator selects the "Pre" position of the mode dial 20 and then presses the release button 22 to the full-stroke position. Then, the system controller 38 sends a control signal to the memory controller 46 for causing it to read nine latest frames of image data out of the main memory 24 and transferring them to the digital signal processor 44. The signal processor 44 processes the nine frames of image data in the previously stated manner and delivers the processed image data to the bus 50. On the other hand, assume that the operator selects the "Pre/Post" position of the mode dial 20 and then presses the release button 22 to the full-stroke position while the memory controller 46 is sequentially writing the latest image data in the main memory 24. Then, the system controller 38 sends a control signal to the memory controller 46 for causing it to write a plurality of additional frames of image data less than nine frames in the main memory 24 while sequentially deleting the oldest image data existing in the memory 24. For example, the memory controller 46 may write five frames of additional image data, including one frame of image data generated just after the release timing, in the main memory 24.

Further, assume that the operator selects the "Post" position of the mode dial 20 and then presses the release button 22 to the full-stroke position. Then, the system controller 46 sends a control signal to the memory controller 46 for causing it to write in the main memory 24 nine consecutive frames of image data that are sequentially picked up at the intervals of $\Delta t$ after the release timing.

The memory controller 46 reads the latest frames of image data stored in the main memory 24 in the above-described manner and delivers them to the digital signal processor 44. The signal processor 44 processes the input image data for multiframe display and outputs the resulting display data to the bus 50. When the operator selects the single shoot mode, as distinguished from the continuous shoot mode, the memory controller 46 writes a single frame of image data picked up at the full-stroke position of the release button 22 in the main memory 24 without regard to the position of the mode dial 20.

A compression/expansion circuit 52 is connected to the bus 50 for coding the YC image data output from the digital signal processor 44 by compression. In the illustrative embodiment, for the compression/expansion circuit 52, use is made of a JPEG (Joint Photographic Expert Group) system that divides YC data vertically and horizontally into 8 (horizontal)×8 (vertical) blocks, executes bidimensional orthogonal conversion and quantization with the blocks of YC data, and codes the quantized data by Huffman coding. The compression/expansion circuit 52 delivers the compressed image data to a memory I/F (interface) 54 on the bus 50. The memory I/F 54 controls the writing and reading of image data out of the removable memory 16 by electrically matching the bus 50 and the memory 16. For example, the memory I/F 54 includes a driver for driving the memory 16. When the memory 16 is implemented by an EEPROM (Electrically-Erasable and Programmable Read Only Memory), a flash memory or similar semiconductor memory, the memory I/F 54 generates a write command and a read command for controlling the memory 16.

More specifically, the external memory 16 is removably connected to the memory I/F 54. The memory I/F 54 is a store control circuit for writing the compressed image data output from the compression/expansion circuit 52 in a preselected area of the memory 16 or reading the image data out of the memory 16 and transferring them to the compression/expansion circuit 52. In the illustrative embodiment, the memory is implemented as a card-like support encapsulating an EEPROM, flash memory or similar semiconductor memory. Alternatively, use may be made of any other suitable type of data recording medium, e.g., a magneto-optical disk or similar rotary recording medium or an optical card. If the memory 16 has a capacity sufficiently greater than the amount of image data to be selected out of the main memory 24, then the memory I/F 54 may receive non-compressed image data from the digital signal processor 44 or the main memory 24 and write them in the memory 16.

The LCD driver 56 and NTSC encoder 48 are also connected to the bus 50. The LCD driver 56 drives the LCD panel 26 and feeds the image data read out of the main memory 24 and processed by the digital signal processor 44 to the LCD panel 26. As a result, the LCD panel 26 selectively displays still pictures or moving pictures in accordance with the input image data. As shown in FIG. 1, the LCD panel 26 of the illustrative embodiment is mounted on the back of the camera 10 in such a manner as to allow the operator to see the image of the scene mainly in the direction in which the operator is expected to look a scene through an optical viewfinder 60. The LCD panel 26 includes an RGB color filter, a deflector plate and liquid crystal, which are interposed between a pair of transparent plates, and forms a visible image represented by the input image data. The LCD panel 26 may, of course, be replaced with an EL (Electro Luminescence) display panel, a PDP (Plasma Display Panel) or similar display device. If desired, the LCD driver 56 and other peripheral circuitry may be formed on the substrate of the LCD panel 26.

The NTSC encoder 48 transforms the image data input on the bus 50 to an image signal capable of being input to a monitor, not shown, connectable to the camera 10. In the illustrative embodiment, the NTSC encoder 48 transforms the RGB image data to an image signal having the NTSC format.

Figure 3:
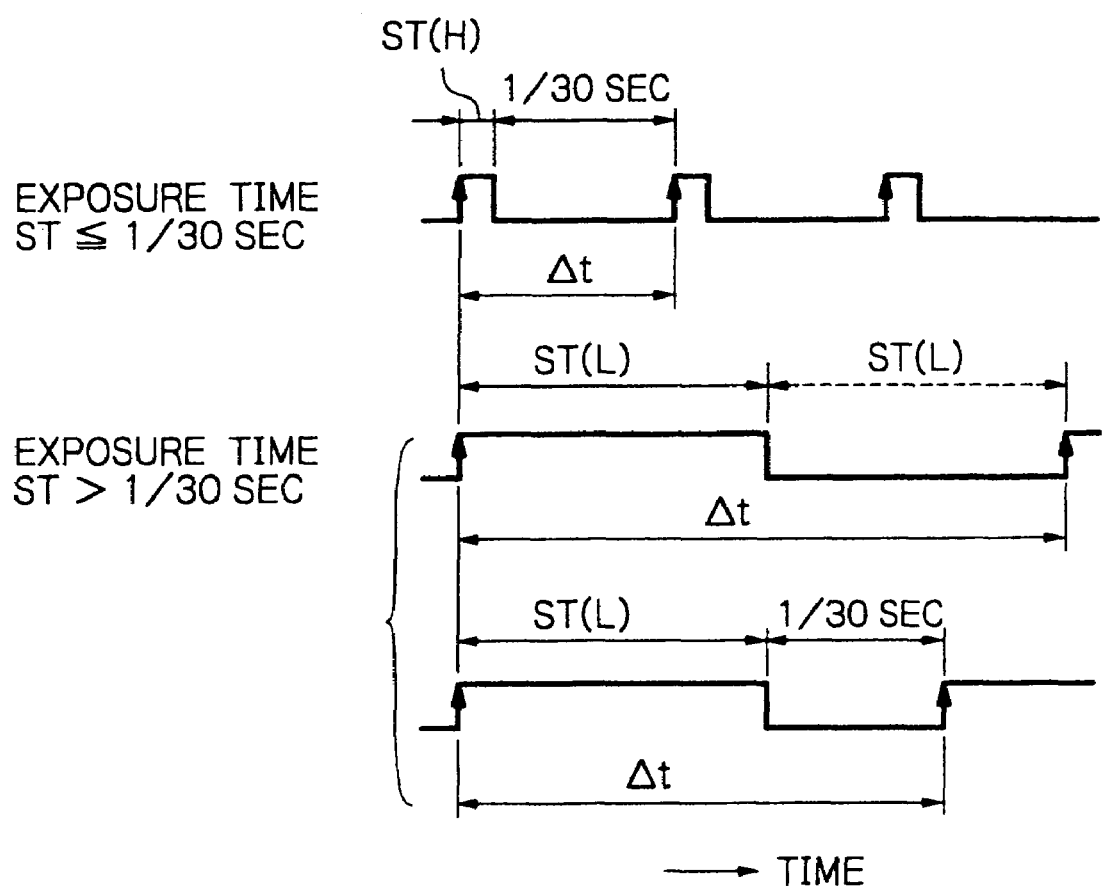
FIG. 3 is a timing chart showing specific timing signals appearing in the illustrative embodiment and each defining a particular interval between successive shots in a continuous shoot mode.

The system controller 38 controls the various sections of the camera 10 in response to the manual operation of the operation panel 18 and includes a CPU (Central Processing Unit), a ROM, a RAM (Random Access Memory), and peripheral circuitry. Particularly, when the operator selects the continuous shoot mode, the controller 38 executes pickup control and record control in accordance with the position of the mode dial 20. Specifically, in the continuous shoot mode, the controller 38 determines the interval $\Delta t$ between successive shots. For example, as shown in FIG. 3, the controller 38 determines an exposure value for a shot on the basis of the photometric value calculated by the digital signal processor 44. The controller 38 then determines a shutter speed ST in accordance with the exposure value and an AE (Automatic Exposure) mode. Assume that the shutter speed ST is faster than or equal to $\frac{1}{30}$ second, which is a period of time necessary for the transfer of one frame of pixel signals. Then, the controller 38 adds $\frac{1}{30}$ second to an exposure time ST corresponding to the shutter speed ST and sets the resulting sum as the interval $\Delta t$. If the shutter speed ST is slower than $\frac{1}{30}$ second, the controller 38 doubles the exposure time ST and sets the resulting product as the interval $\Delta t$. This product may be replaced with the sum of the exposure time ST and $\frac{1}{30}$ second, if desired.

A timer 58 is connected to the system controller 38. In response to a control signal fed from the system controller 38, the timer 58 counts the interval $\Delta t$ set by the controller 38 and generates a timing signal defining the interval $\Delta t$. The timer 58 feeds the timing signal to the system controller 38 as an interrupt signal every time the interval $\Delta t$ expires. Every time the system controller 38 detects the interrupt signal within a preselected valid interrupt acceptance period, it accepts the interrupt and delivers control signals for a single shot to the optics driver 34 and CCD driver 36.

The system controller 38 recognizes operation information detected by the operation panel 18 and executes control in accordance with the operation. As shown in FIG. 1, the operation panel 18 includes a power switch 62, the release button 22 having the half-stroke position and full-stroke position, and the release switch. The release switch is implemented as two release switches S1 and S2 responsive to the half-stroke position and full-stroke position, respectively. The mode dial 20 is a switch capable of outputting information representative of any one of the "Pre", "Pre/Post" and "Post" positions selected by the operator. When the "Pre/Post" position is selected, the system controller 38 may execute control such that five additional frames are picked up from the time t=0 just after the turn-on of the release switch S2 and stored in the main memory 24. Alternatively, two to eight additional frames may be picked up from the time just after the turn-on of the release switch S2 at the intervals $\Delta t$ for the purpose of varying the balance between the shots before the turn-on of the release switch S2 and the shots after the same. Further, one frame or nine frames may be additionally picked up in order to execute the same operation as when the "Pre" position or the "Post" position is selected.

The "F" switch 28, "B" switch 30 and enter/store switch 32 also arranged on the operation panel 18 are used to select desired one of the pictures stored in the main memory 24 and appearing on the LCD panel 26. In response to signals output from the switches 28, and 32, the system controller 38 designates the desired picture picked up at the respective timing and causes it to be stored in the external memory 16. When the desired picture is selected on the "F" switch 28 and "B" switch 30, the frame of the picture has its attributes, including color and brightness, changed and is distinguished from the other pictures thereby. When the enter/store switch 32 is pressed, the desired picture is recorded in the memory 16.

Further, the system controller 38 executes various adjustments for a shot, e.g., adjusts the focus and determines a lens opening and a shutter speed. The digital signal processor 44 calculates various estimated values for shot adjustment by using the image data output from the ADC 42, as stated earlier. The system controller 38 controls the various sections of the camera 10 on the basis of the estimated values. Specifically, the controller 38 delivers to the optics driver 34 a control signal for controlling the focal position of the lens and a control signal for controlling the duration of opening of the mechanical shutter. Also, the controller 38 feeds an electronic shutter control signal to the CCD driver 36 for controlling the duration of charge storage in the CCD image sensor 14. In addition, the controller 38 delivers a control signal for controlling the color balance of the image data to the digital signal processor 44. The digital signal processor 44 adjusts the levels of the RGB image data in accordance with the color balance control signal, thereby adjusting white balance.

Figure 4:
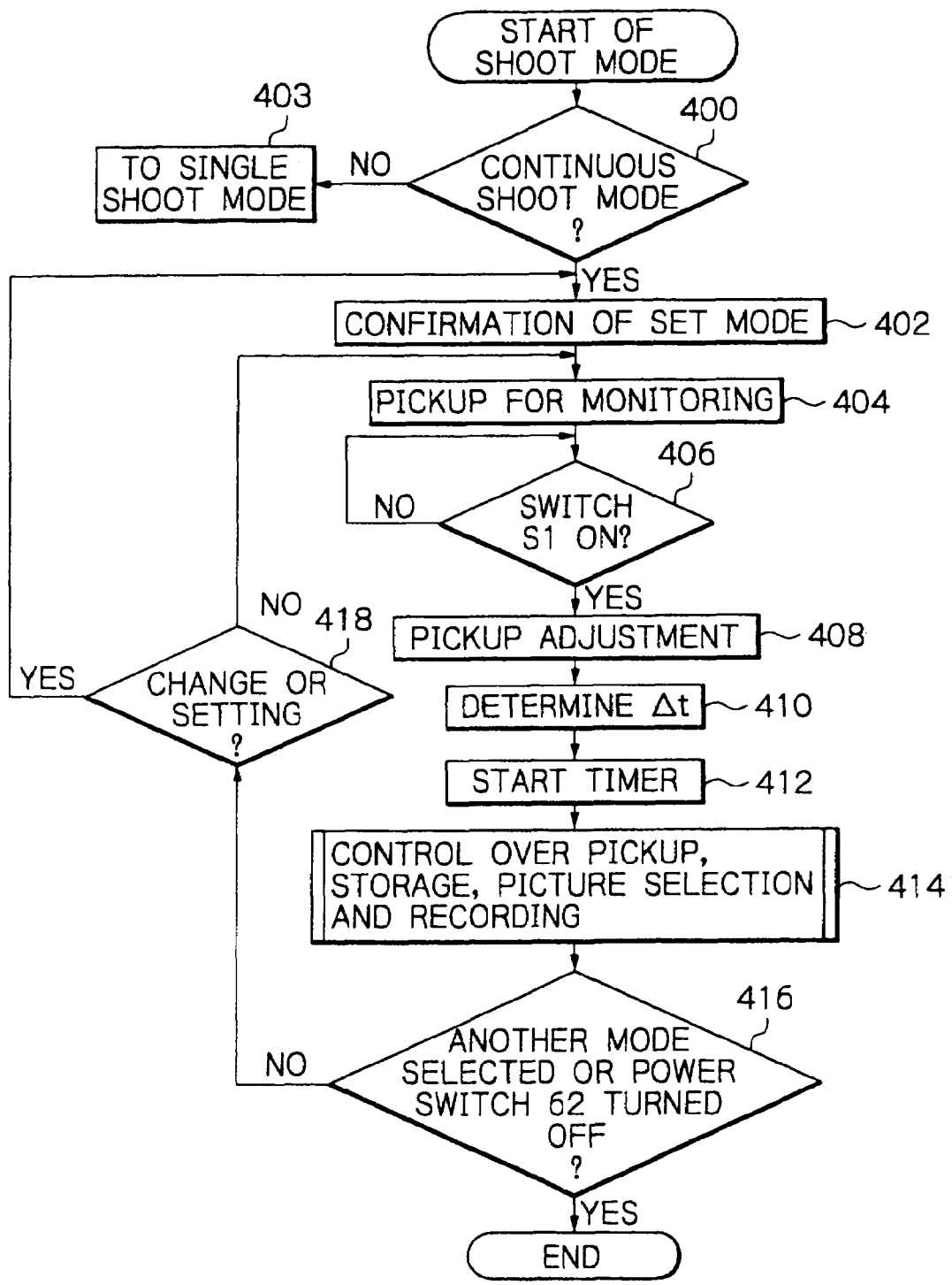
FIG. 4 is a flowchart demonstrating a basic routine to be executed by the illustrative embodiment.

A specific operation of the camera 10 will be described with reference to FIGS. 4 through 9. As shown in FIG. 4, when a shoot mode is set via operator's mode setting operation, the system controller 38 determines whether or not the continuous shoot mode is selected (step 400). If the answer of the step 400 is positive (Yes), the controller 38 executes a step 402; if otherwise (No, step 400), it executes a step 403 assigned to a single shoot mode. In the step 402, the controller 38 identifies the position "Pre", "Pre/Post" or "Post" of the mode dial 20 selected by the operator.

Subsequently, the controller 38 drives the optics 12 and CCD image sensor 14 via the optics driver 34 and CCD driver 36, respectively, thereby starting image pickup for a monitoring purpose (step 404). At this instant, the mechanical shutter is left open. The image sensor 14 continuously output pixel signals representative of the scene being picked up via the lens. The CDS circuit 40 and ADC 42 process the outputs of the image sensor 14. The ADC 42 delivers the resulting image data to the digital signal processor 44.

The digital signal processor 44 executes simple image processing for allowing moving pictures to be continuously displayed. The processed image data are input to the LCD driver 56 via the memory controller 46 and bus 50. As a result, moving pictures representative of the scene being picked up appear on the LCD panel 26 as if the scene were seen through the optical viewfinder 60, allowing the operator to confirm a desired subject. At the same time, the digital signal processor 44 and system controller 38 control the electronic shutter available with the image sensor 14 and set a lens opening on the basis of the image data, thereby adjusting brightness for the display of the moving picture. If desired, the focus of the lens may be automatically adjusted on the basis of the estimated values derived from the image data.

After the step 404, the system controller 38 determines whether or not the release switch S1 has been turned on, e.g., whether or not the release button 22 has been pressed to its half-stroke position (step 406). If the answer of the step 406 is Yes, the controller 38 executes various kinds of adjustment for the pickup of a still picture that include automatic exposure adjustment, automatic focus adjustment and automatic white balance adjustment (step 408). These adjustments are effected with higher accuracy than the adjustments assigned to the display of the moving pictures. When the switch S1 once turned on is turned off before the release switch S2 is turned on in a step 414, which will be described later, the controller 38 repeats the steps 404 and 406.

After the step 408, the controller 38 determines an interval Δt between consecutive shots in accordance with a shutter speed or exposure time ST derived from a photometric value determined in the step 408 (step 410). If the exposure time ST is longer than or equal to 1/30 second, the controller 38 adds 1/30 second to the shutter speed ST and uses the resulting sum as the interval Δt. Conversely, if the exposure time ST is shorter than 1/30 second, the controller 38 doubles the exposure time ST and uses the resulting product as the interval Δt. The controller 38 sets the interval Δt in the timer 58 and then starts the timer 58 (step 412). The timer 58 generates a timing signal every time the interval Δt expires.

Figure 5:
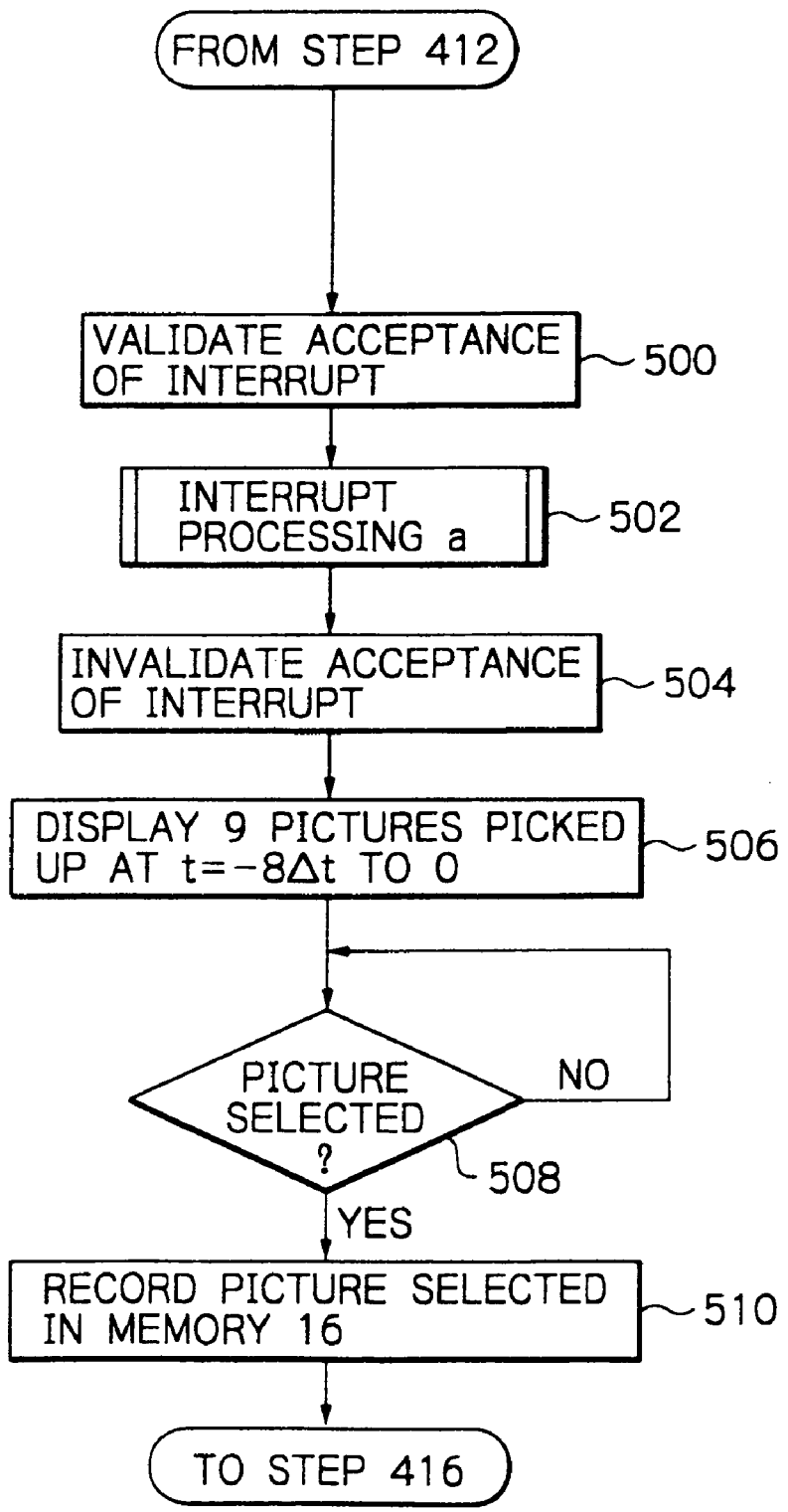
FIG. 5 is a flowchart representative of a procedure included in the basic routine and executed when a mode dial is set at a "Pre (prior)" position.
Figure 6:
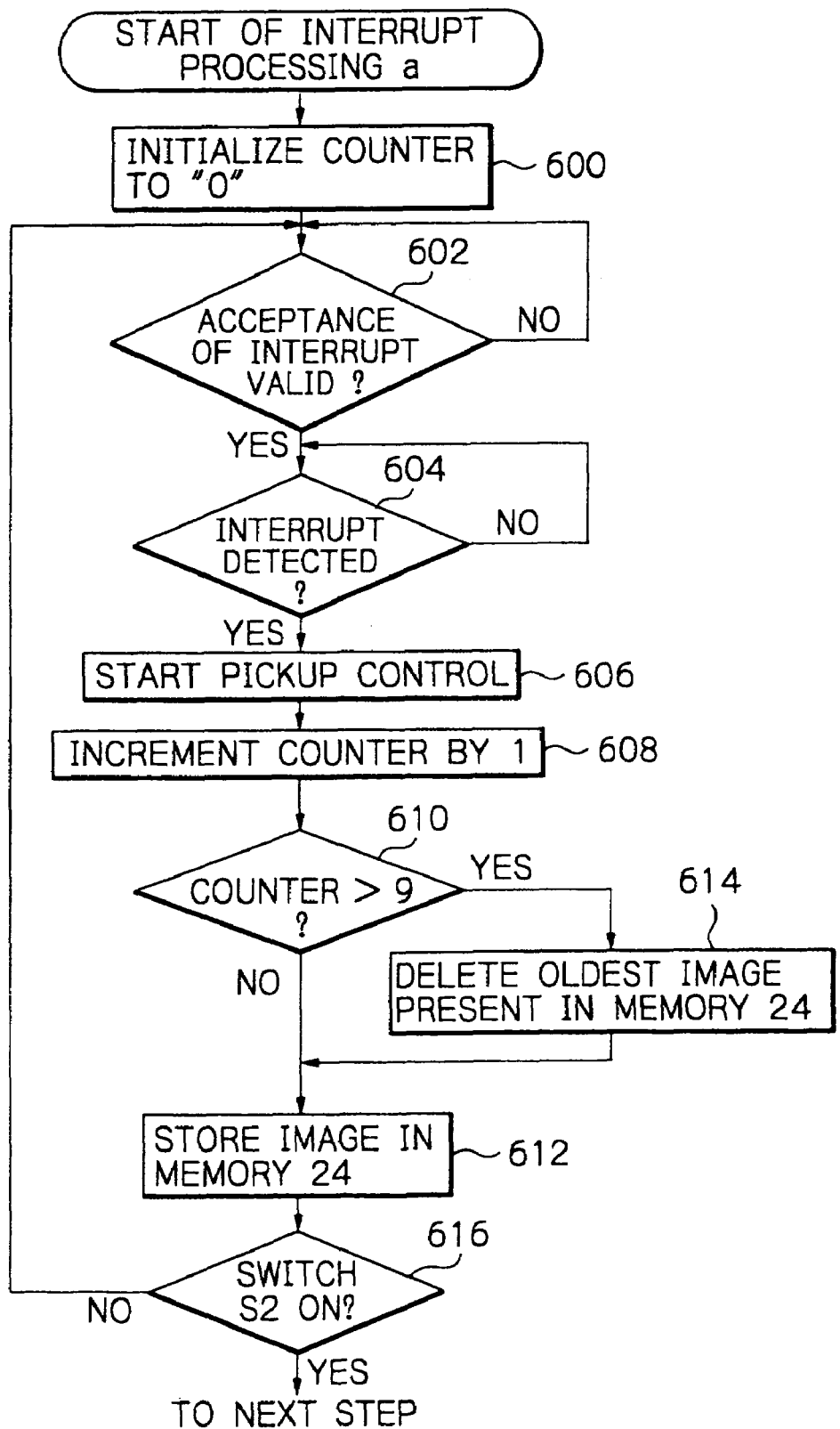
FIG. 6 is a flowchart representative of interrupt processing a included in the procedure of FIG. 5.

In a step 414 following the step 412, the controller 38 executes processing based on the turn-on of the release switch S2 and mode setting as well as processing for designating a desired picture and recording it. Specifically, as shown in FIG. 5, when the mode dial 22 is set at the "Pre" position, the controller 38 validates the acceptance of an interrupt due to the timing signal to be output from the timer 58 and accepts the interrupt when it occurs (step 500). The controller 38 then executes interrupt processing a (step 502). FIG. 6 shows the interrupt processing a specifically. As shown, the controller 38 initializes a counter to "0" (step 600) and then determines whether or not the acceptance of an interrupt is valid (step 602). If the answer of the step 602 is Yes, the controller 38 determines whether or not the timing signal from the timer 58 has been detected as an interrupt signal (step 604). Subsequently, the controller 38 starts pickup control (step 606) and then increments the counter by 1 (one) (step 608).

After the step 608, the controller 38 determines whether or not the count of the counter has exceeded "9" (step 610). If the answer of the step 610 is No, the controller 38 executes pickup control for causing the scene to be picked up and causing the resulting image data to be written to the main memory 24 (step 612). If the answer of the step 610 is No, meaning that the count of the counter has not exceeded "9", the controller 38 causes the oldest image data existing in the main memory 24 to be deleted (step 614) and then executes the step 612.

Subsequently, the controller 38 determines whether or not the release switch S2 has been turned on (step 616). If the answer of the step 616 is No, the operation returns to the step 602. If the answer of the step 616 is Yes, the controller 38 ends the interrupt processing a and executes a step 504 shown in FIG. 5.

As stated above, in the interrupt processing a, nine latest frames of image data generated under the pickup control of the controller 38 are sequentially written to the main memory 24 while being sequentially deleted in the order in which they are written. As a result, the image data existing in the main memory 24 are cyclically updated. After the release switch S2 has been turned on (Yes, step 616), the controller 38 causes one additional frame to be picked up and causes the resulting image data to be written to the main memory 24 before executing the step 504 of FIG. 5. Therefore, when the mode dial 20 is in the "Pre" position, one additional frame picked up just after the turn-on of the release switch S2 is dealt with as a frame picked up at the time t=0.

In the step 504 following the interrupt processing a (step 502), the controller 38 invalidates the acceptance of an interrupt (step 504), ends the pickup control based on the timing signals, and ends the updating of the image data existing in the main memory 24.

Subsequently, the controller 38 causes the nine frames of image data picked up at the times t=−8 Δt through t=0 to be sequentially read out of the main memory 24 (step 506). The digital signal processor 44 transforms such image data to display data and delivers the display data to the LCD driver 56 on the bus 50. The LCD driver 56 causes the LCD panel 26 to display the nine latest frames or pictures thereon in accordance with the above display data in a multiframe format.

After the step 506, the controller 38 determines the statuses of the "F" switch 28 and "B" switch 30 operated by the operator to select desired one of the pictures appearing on the LCD panel 26. The controller 28 then changes the color and brightness of the framework of the selected picture, showing the operator that the desired picture can be selected. When the operator, watching the LCD panel 26, selects the desired picture on the enter/store switch 32 (Yes, step 508), the controller 38 executes a step 510. It is to be noted that the operator may select two or more of the pictures appearing on the LCD panel 26 by operating the switches 28, 30 and 32.

In the step 510, the controller 38 causes the image data corresponding to the picture selected by the operator to be read out of the main memory 24 and input to the compression/expansion circuit 52 via the bus 50. The compression/expansion circuit 52 codes the input image data by compression and delivers the coded image data to the memory I/F 54. At this instant, the controller 38 feeds various control information relating to the coded image data, including the time of pickup, to the memory I/F 54. The memory I/F 54 writes the image data and control information in the preselected area of the external memory 16.

After the step 510, the controller 38 executes a step 416 shown in FIG. 4 for determining whether or not the operator has changed the operation mode or has turned off the power switch 62 (step 416). If the answer of the step 416 is Yes, the controller 38 executes processing that matches with the operator's operation. If the answer of the step 416 is No, the controller 38 determines whether or not the operator has changed the position of the mode dial 20 (step 418). If the answer of the step 418 is Yes, the controller 38 returns to the step 402; if otherwise (No, step 418) the controller 38 returns to the step 404.

As stated above, when the mode dial 20 is located at the "Pre" position, nine latest frames of image data are written to the main memory 24 in response to the turn-on of the release switch S1. On the turn-on of the other release switch S2, one additional frame is picked up. As a result, image data including additional image data generated just after the turn-on of the release switch S2 are stored in the main memory 24. It follows that the image data picked up at a desired time can be selected and output.

Figure 7:
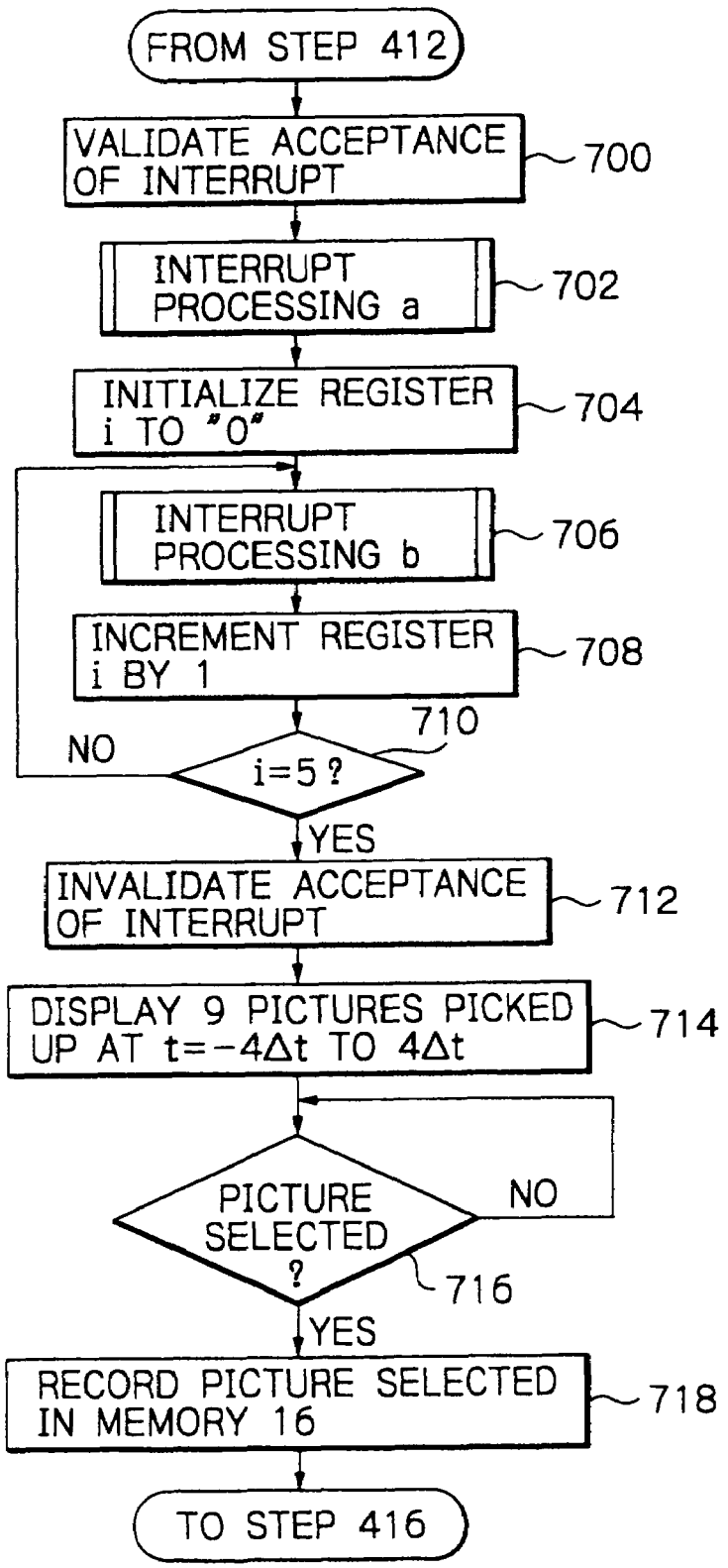
FIG. 7 is a flowchart representative of a procedure also included in the basic routine and executed when the mode dial is set at a "Pre/Post (posterior)" position.

When the mode dial 20 is located at the "Pre/Post" position, the system controller 38 executes, in the step 414 of FIG. 4, a procedure different from the above-described procedure. This procedure differs from the previous procedure in that it picks up a plurality of additional frames, as distinguished from one additional frame, at consecutive times after the turn-on of the release switch S2. Specifically, as shown in FIG. 7, the controller 38 validates the acceptance of an interrupt (step 700), as in the step 500 of FIG. 5, and then executes the interrupt processing a in the manner shown in FIG. 6 (step 702). When the release switch S2 is turned on, as determined in the step 702, the controller 38 initializes the content of the register i to "0" (step 704) and then executes interrupt processing b (step 706).

Figure 8:
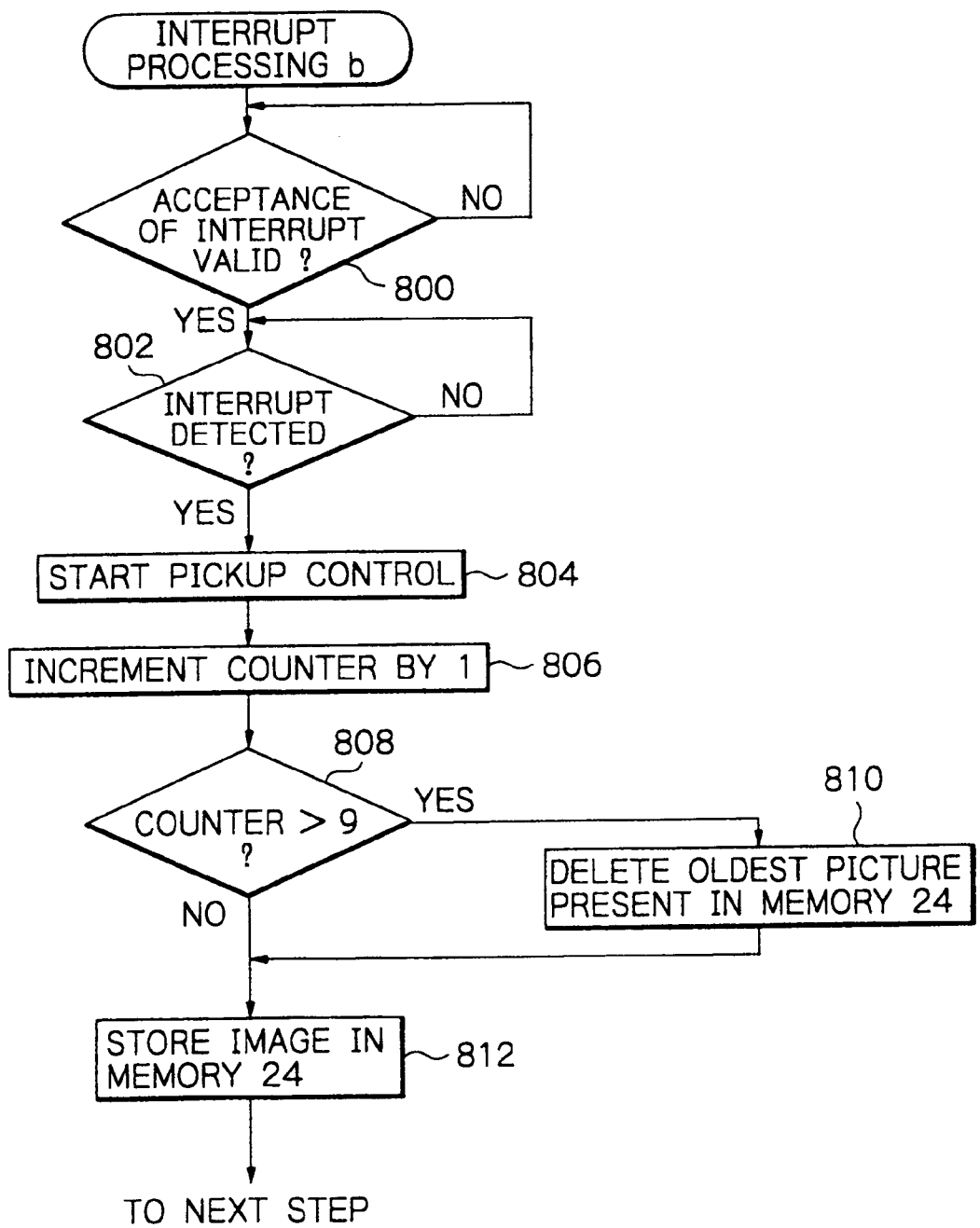
FIG. 8 is a flowchart representative of interrupt processing b included in the procedure of FIG. 7.

As shown in FIG. 8, the interrupt processing b differs from the interrupt processing a, FIG. 6, in that the system controller 38 executes neither one of the steps 600 and step 616. In steps 800 through 812 shown in FIG. 8, the controller 38 picks up frames at the intervals Δt and deletes the oldest frame existing in the main memory 24 so as to update one latest frame. On storing the image data in the step 812, the controller 38 increments the content of the register by 1 (step 708, FIG. 7) and then determines whether or not the content of the resister i is equal to "5" (step 710). If the answer of the step 710 is No, the controller 38 repeatedly executes the steps 706 and 708 until the content of the register i reaches "5". In this manner, during the interval between the turn-on of the release switch S1 and the turn-on of the release switch S2, four consecutive frames of image data are sequentially written to the main memory 24. Then, five consecutive frames of image data picked up after the turn-on of the release switch S2 are sequentially written to the main memory 24.

If the answer of the step 710 is Yes, meaning that the content of the register i has reached "5", the controller 38 invalidates the acceptance of an interrupt and ends the pickup processing and the storage of the image data in the main memory 24 (step 712). Subsequently, the controller 38 causes the image data picked up at the times t=-4 Δt through t=4 Δt to be read out of the main memory 24 and input to the digital signal processing circuit 44. The digital signal processor 44 processes the input image data and delivers the processed image data to the LCD driver 56. Consequently, the LCD panel 26 displays nine frames or pictures in total thereon in a multiframe format (step 714).

Again, in a step 716 following the step 714, the controller 38 determines the statuses of the "F" switch 28 and "B" switch 30 operated by the operator to select desired one of the pictures appearing on the LCD panel 26. The controller 28 then varies the color and brightness of the framework of the desired picture, showing the operator that the desired picture can be selected. When the operator, watching the LCD panel 26, selects the desired picture on the enter/store switch 32 (Yes, step 716), the controller 38 causes image data of the picture selected to be read out of the main memory 24, coded by compression, and then written to the removable memory 16 via the memory I/F 54 (step 718).

After the step 718, the controller 38 executes the step 416 shown in FIG. 4 for determining whether or not the operator has changed the operation mode or has turned off the power switch 62. If the answer of the step 416 is Yes, the controller 38 executes preselected processing that matches with the operator's operation. If the answer of the step 416 is No, the controller 38 determines whether or not the operator has changed the position of the mode dial 20 (step 418). If the answer of the step 418 is Yes, the controller 38 returns to the step 402; if otherwise (No, step 418), the controller 38 returns to the step 404.

As stated above, when the mode dial 20 is set at the "Pre/Post" position, nine latest frames of image data begin to be written to the main memory 24 when the release switch S1 is turned on, while being sequentially updated. Subsequently, when the release switch S2 is turned on, five additional frames of image data are picked up and written to the main memory 24. As a result, nine frames of image data are stored in the main memory 24 in total. It follows that the image data picked up at a desired time can be selected and output.

Figure 9:
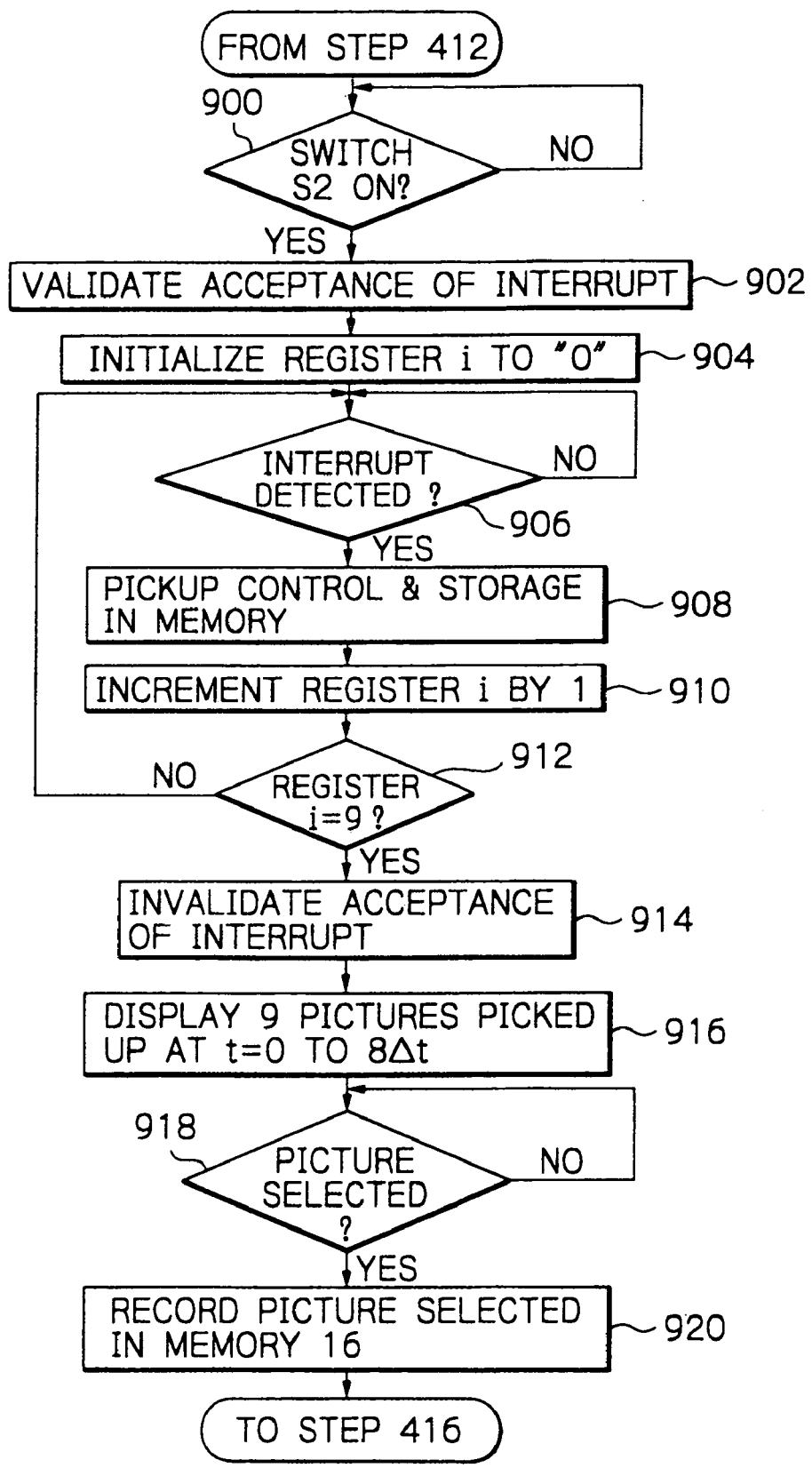
FIG. 9 is a flowchart representative of a procedure also included in the basic routine and executed when the mode dial is set at a "Post" position.

When the mode dial 20 is set at the "Post" position, the system controller 38 executes, in the step 414 of FIG. 4, a procedure shown in FIG. 9. As shown, the system controller 38 determines whether or not the release switch S2 has been turned on (step 900). If the answer of the step 900 is Yes, the controller 38 validates the acceptance of an interrupt (step 902). The controller 38 then initializes the register i to "0" (step 904). Thereafter, the controller 38 determines whether or not an interrupt has been detected (step 906).

When an interrupt is detected (Yes, step 906) the controller 38 executes pickup control and writes one frame of image data picked up in accordance with the timing signal in the main memory 24 (step 908). The controller 38 then increments the register i by 1 (step 910) and determines whether or not the content of the register i is equal to "9" (step 912). If the answer of the step 912 is Yes, the controller 38 invalidates the acceptance of an interrupt (step 914); if otherwise (No, step 912), the controller 38 returns to the step 906 and waits for an interrupt.

The controller 38 therefore causes image data to be repeatedly picked up at the intervals Δt in accordance with the timing signals until the content of the register i reaches "9". Consequently, nine consecutive frames of image data picked up at the times t=0 through t=8 Δt are stored in the main memory 24. These frames or pictures are read out of the main memory 24 and displayed on the LCD panel 26 in a multiframe format (step 916). The controller 38 then determines whether or not the operator has selected desired one of the nine pictures (step 918). If the answer of the step 918 is Yes, the controller 38 records the picture selected in the external memory 16 (step 920). The step 920 is followed by the step 416 shown in FIG. 4.

As stated above, when the mode dial 20 is set at the "Post" position, nine consecutive frames of image data are written to the main memory 24 in response to the turn-on of the release switch S2. This allows the operator to select any one of the image data picked up at a desired time.

In the illustrative embodiment, a plurality of frames of image data continuously picked up are sequentially written to the main memory 24, so that the operator can select desired one of the frames stored in the memory 24. A modification of the illustrative embodiment and the operation thereof will be described hereinafter. In the modification, the consecutive frames of image data picked up and then processed are sequentially recorded in the external memory 16 and then read out of the memory 16 to be displayed on the LCD panel 26. This also allows the operator to select desired one of the frames appearing on the LCD panel 26. In the modification, the frames stored in the memory 16 other than the frame selected are deleted.

Specifically, in the modification, the system controller 38 causes the compression/expansion circuit 52 to code the image data output from the digital signal processor 44 and feeds the coded image data to the memory I/F 54. As a result, the consecutive frames of image data picked up at the intervals Δt are recorded in the removable memory 16. To allow the operator to select a desired frame to be left undeleted in the memory 16, the controller 38 feeds a control signal for reading all of the frames out of the memory 16 to the memory I/F 54. The controller 38 then causes the compression/expansion 52 to decode the image data read out of the memory 16 via the memory I/F 54 by expansion. The decoded image data are written to the main memory 24. Further, the controller 38 causes the digital signal processor 44 to convert the coded image data to display data and deliver the display data to the LCD driver 56. Consequently, the consecutive frames are displayed on the LCD panel 26 in a multiframe format. When the operator manipulates the operation panel 18 in a preselected manner for selecting a desired frame to be left in the memory 16, the controller 38 sends to the memory I/F 54 a control signal for deleting the frames stored in the memory 16 other than the desired frame.

Figure 10:
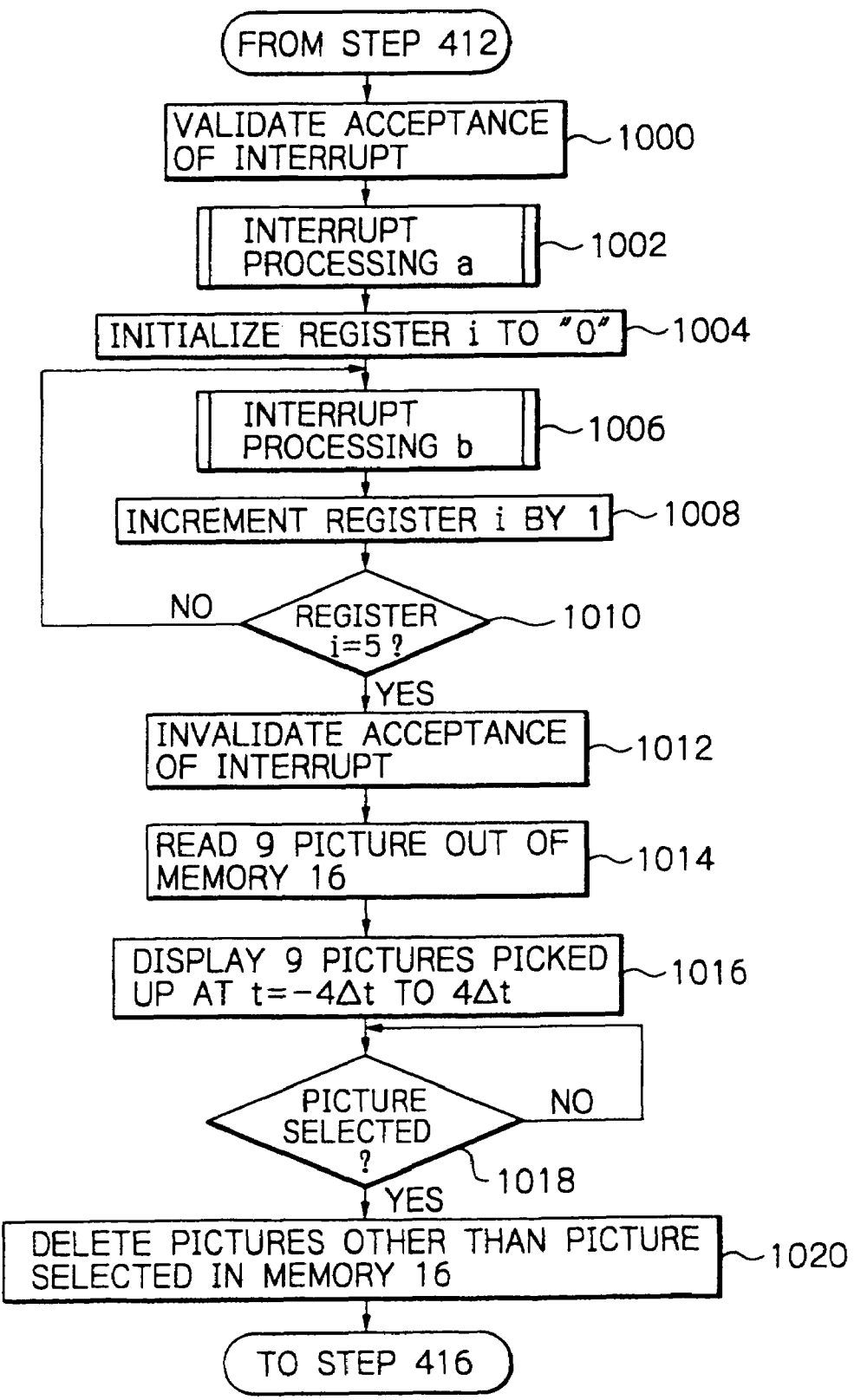
FIG. 10 is a flowchart showing a procedure representative of a modification of the illustrative embodiment.

FIG. 10 shows the operation of the above-described modification more specifically on the assumption that the mode dial 22 is located at the "Pre/Post" position. As for the operation of the entire camera 10, the operation shown in FIG. 10 is identical with the operation described with reference to FIG. 4. As shown in FIG. 10, in the step 414 of FIG. 4, the system controller 38 validates the acceptance of an interrupt due to the timing signal output from the timer 58 (step 1000).

Figure 11:
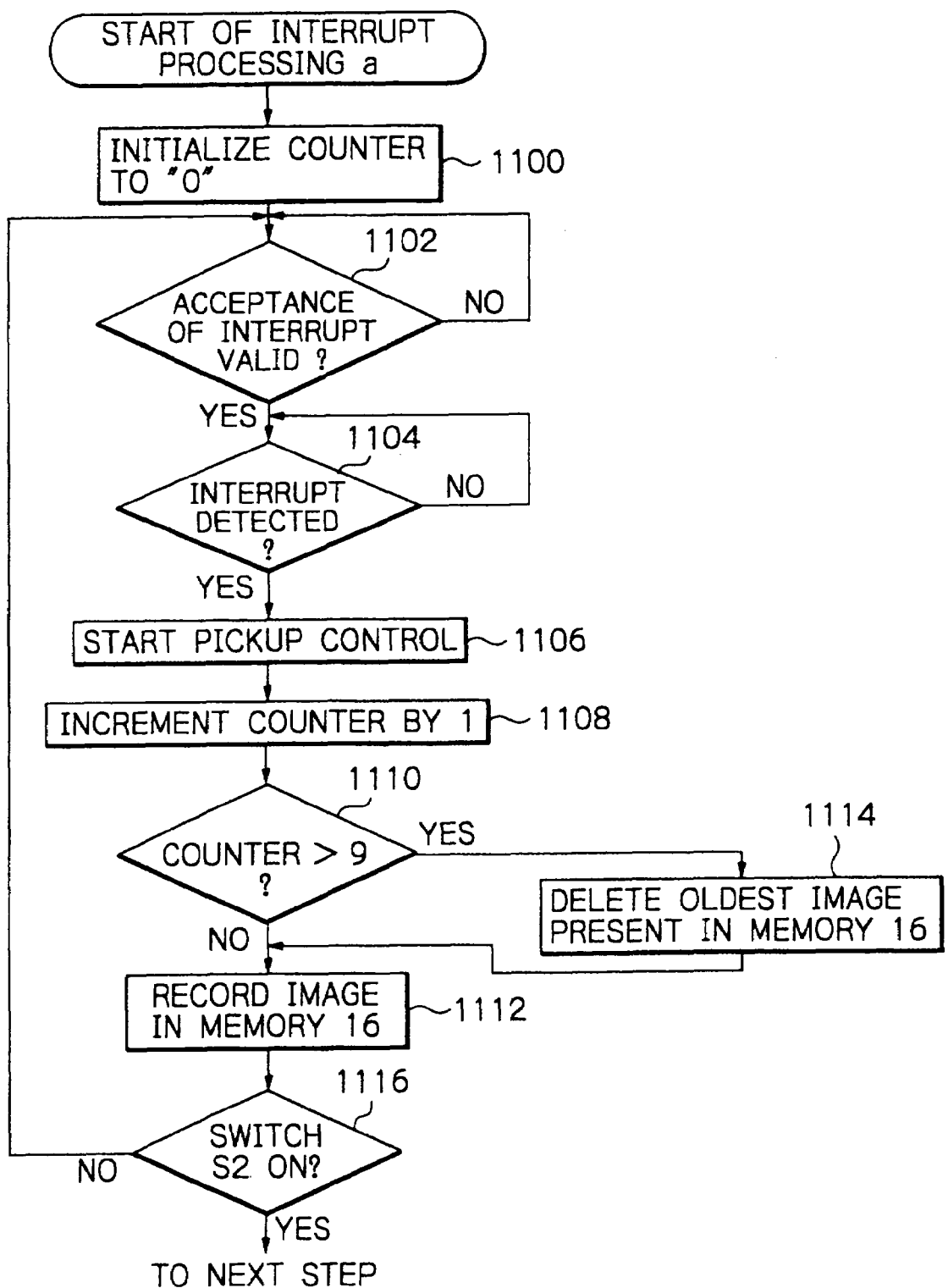
FIG. 11 is a flowchart showing interrupt processing a included in the procedure of FIG. 10.

Subsequently, the controller 38 executes interrupt processing a (step 1002). FIG. 11 shows the interrupt processing a in detail. As shown, the controller 38 initializes the counter to "0" (step 1100) and then determines whether or not the acceptance of an interrupt is valid (step 1102). If the answer of the step 1102 is Yes, the controller 38 determines whether or not an interrupt derived from the timing signal has been detected (step 1104). If the answer of the step 1104 is Yes, the controller 38 starts pickup control (step 1106) and then increments the counter by 1 (step 1108). Subsequently, the controller 38 determines whether or not the count of the counter has exceeded "9" (step 1110).

If the answer of the step 1110 is No, the controller 38 writes image data generated by the pickup control in the memory 16 (step 1112). If the answer of the step 1110 is Yes, controller causes the oldest one of the image data existing in the memory 16 to be deleted (step 1114). The step 1114 is also followed by the step 1112.

After the step 1112, the controller 38 determines whether or not the release switch S2 has been turned on (step 1116). If the answer of the step 1116 is Yes, the controller 38 executes a step 1004 shown in FIG. 10; if otherwise (No, step 1116), the controller 38 returns to the step 1102, FIG. 11. In this manner, nine latest frames of image data generated by the pickup control are recorded in the memory 16 while the oldest image data with respect to the time of pickup is deleted. The image data stored in the memory 16 are therefore cyclically updated. After the release switch S2 has been turned on (Yes, step 1116) the controller 38 causes one additional frame to be picked up and written to the main memory 24 and then executes a step 1004 and consecutive steps shown in FIG. 10. Therefore, in the "Pre/Post" mode operation, one frame picked up just after the turn-on of the release switch S2 is dealt with as a frame picked up at the time t=0.

After the interrupt processing a, the controller 38 initializes the register i to "0" (step 1004) and then executes interrupt processing b (step 1006).

Figure 12:
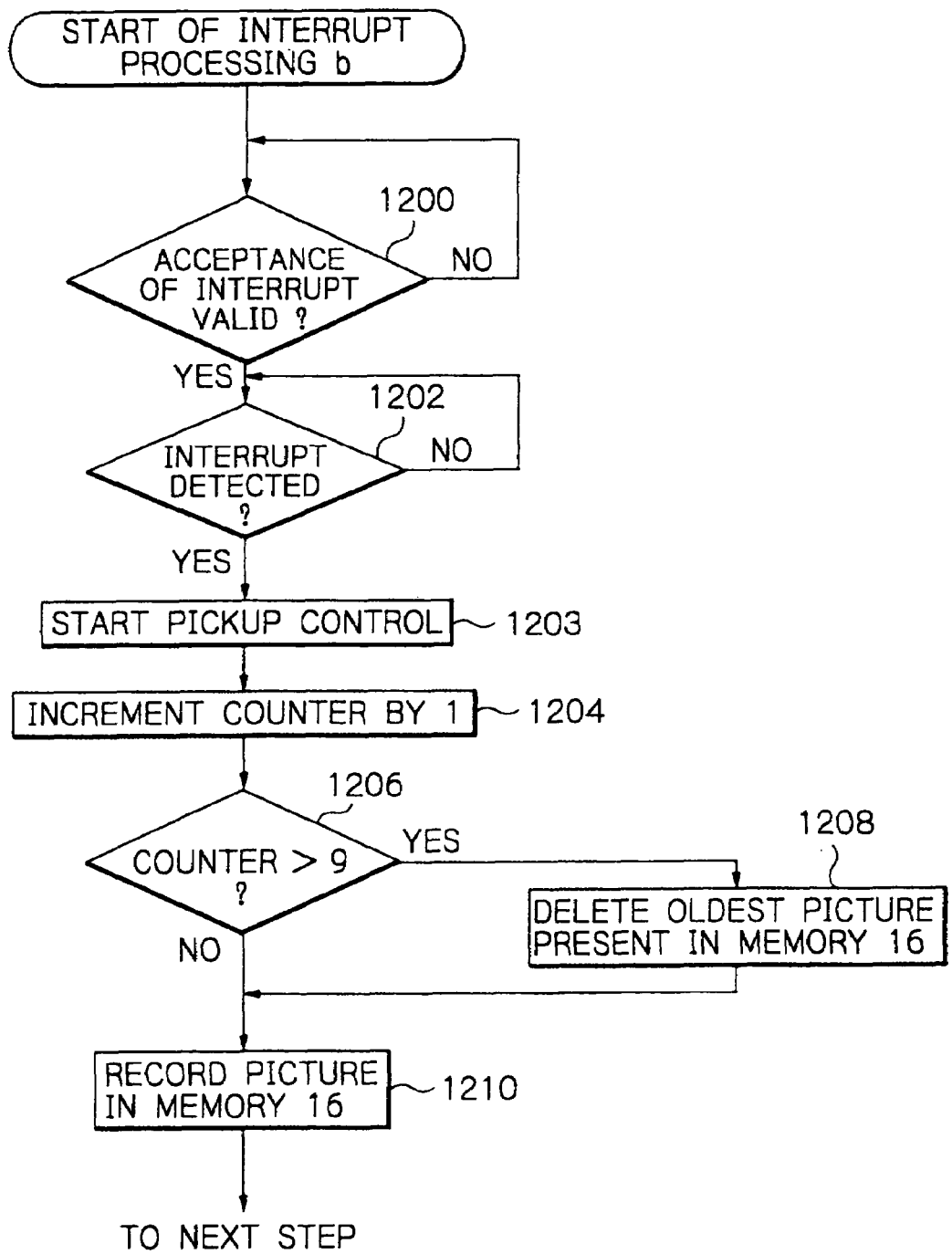
FIG. 12 is a flowchart showing interrupt processing b also included in the procedure of FIG. 10.

FIG. 12 shows the interrupt processing b specifically. As shown, the interrupt processing b is identical with the interrupt processing a of FIG. 11 except that it does not include the steps 1100 and 1116. In a sequence of steps 1200 through 1210, the system controller 38 executes pickup processing at the intervals Δt, deletes the oldest frame of image data stored in the removable memory 16, and updates one latest frame of image data. After the image data have been fully written to the memory 16 (step 1210), the controller 38 increments the content of the register by 1 (step 1008, FIG. 10) and then determines whether or not the content of the register i is equal to "5" (step 1010). If the answer of the step 1010 is No, the controller 38 repeats the steps 1006 through 1010 until the content of the register i reaches "5". As a result, four consecutive frames picked up between the time when the release switch S1 is turned on and the time when the release switch S2 is turned on and five consecutive frames picked up after the turn-on of the switch S2 are stored in the memory 16.

If the answer of the step 1010 is Yes, the controller 38 invalidates the acceptance of an interrupt and thereby ends the pickup control and the storage of image data in the memory 16 (step 1012). Subsequently, the controller 38 causes the nine frames of image data to be read out of the memory 16 and transferred to the main memory 24. The nine frames of image data are delivered from the main memory 24 to the LCD driver 56 via the digital signal processor 44. Consequently, the nine frames or pictures picked up at the times t=−4Δt through t=4Δt are displayed on the LCD panel 26 in a multiframe format (step 1016).

When the operator, watching the LCD panel 26, selects and enters desired one of the nine pictures (Yes, step 1018), the controller 38 causes the pictures stored in the memory 16 other than the picture selected to be deleted (step 1020). The controller 38 then determines whether or not the operator has selected another operation mode or has turned off the power switch 62 (step 416, FIG. 4). If the answer of the step 416 is Yes, the controller 38 executes processing matching with the operator's operation. If the answer of the step 416 is No, the controller determines whether or not the operator has changed the position of the mode dial 20 (step 418). The controller 38 returns to the step 402 if the answer of the step 418 is Yes or returns to the step 404 if otherwise.

As stated above, in the modification of the illustrative embodiment, a plurality of frames of image data sequentially picked up at consecutive times are recorded in the removable memory 16. Subsequently, the frames stored in the memory 16 other than a desired frame are deleted, so that only the desired frame is left in the memory 16. While the modification has concentrated on the "Pre/Post" position of the mode dial 20, it is also practicable when the mode dial 20 is set at the "Pre" position or the "Post" position.

In the illustrative embodiment and its modification, the system controller 38 executes control on the basis of the status of the release switch S1 responsive to the half-stroke position of the release button 22. Alternatively, an arrangement may be made such that preparations for a shot performed by the operator are detected and interpreted as representing the turn-on of the release switch S1.

For example, as shown in FIGS. 1 and 2, a sensor 64 is mounted on the camera 10 at the left-hand side of the optical viewfinder 60. When the operator positions the camera 10 in front of eye for looking in at the viewfinder 60, the sensor 64 senses the operator's eye or skin adjoining the camera 10. The sensor 64 is made up of an LED (Light Emitting Diode) or similar light emitting device 66 and a photo-sensitive device 68. The light emitting device 66 emits, e.g., infrared rays intermittently while the photo-sensitive device 68 senses the infrared rays reflected by the operator and outputs a signal in accordance with the incident rays. The output signal of the sensor 64 is connected to the operation panel 18. The operation panel 18 reports the output of the sensor 60 to the system controller 38. In response, the system controller 38 interprets the sensor output as representing the turn-on of the release switch S1. This kind of function is desirable when, e.g., the operator turns off the LCD panel 26 for a power saving purpose and uses the optical viewfinder 60.

Figure 13:
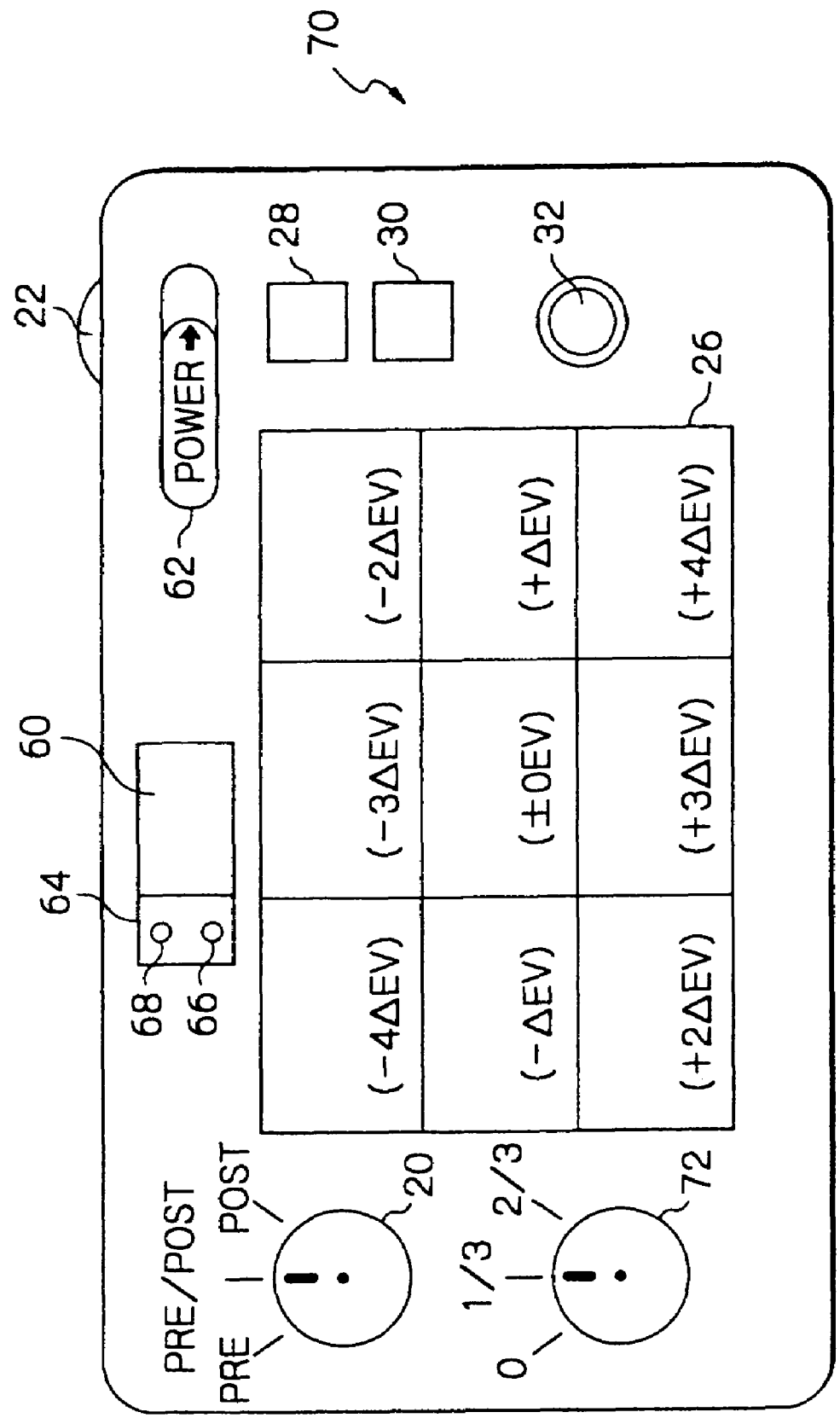
FIG. 13 is an external view showing an alternative embodiment of the present invention.
Figure 14:
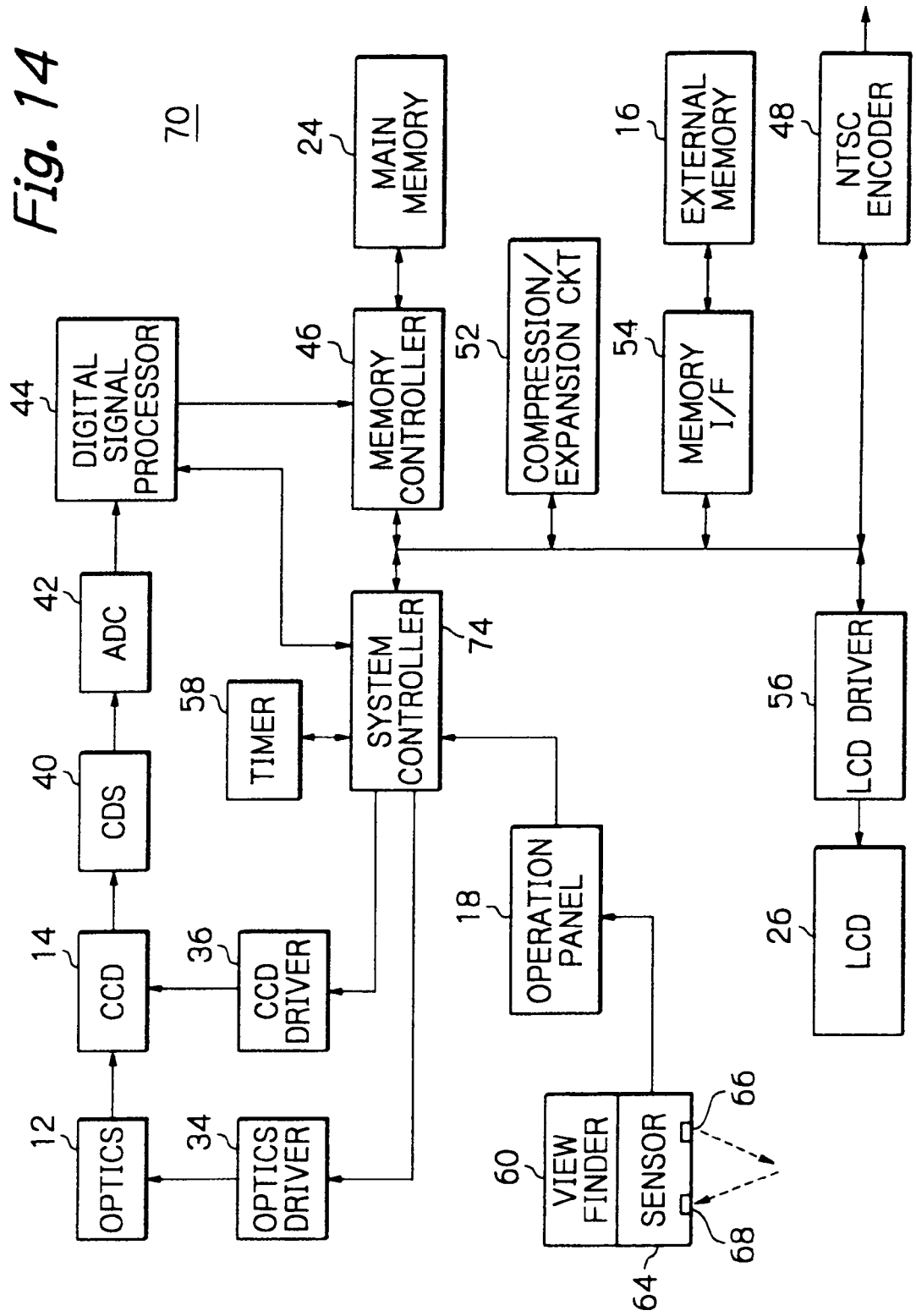
FIG. 14 is a block diagram schematically showing a specific circuit configuration of the alternative embodiment.

Reference will be made to FIGS. 13 and 14 for describing an alternative embodiment of the present invention. As shown, a digital camera, generally 70, differs from the digital camera 10 in that it additionally has an automatic bracketing capability, i.e., picks up a scene while correcting the exposure value stepwise in the continuous shoot mode. In the figures, identical structural elements are designated by identical reference numerals, and a detailed description thereof will not be made in order to avoid redundancy.

As shown in FIG. 13, the camera 70 includes an automatic bracketing exposure (ABE hereinafter) dial 72 positioned on the operation panel 18. The ABE dial 72 allows the operator, intending to use the automatic bracketing function, to set a desired step value. In the illustrative embodiment, the ABE dial 72 has a "0" position that cancels the automatic bracketing function, a "⅓" position that effects bracketing by a step of ⅓ EV, and a "⅔" position that effects bracketing by a step of ⅔ EV. A system controller 74 shown in FIG. 14 has a pickup control function for executing automatic bracketing in addition to the various functions of the system controller 38, FIG. 2. As for the automatic bracketing function, a ½ exposure step may be substituted for or combined with the ⅓ exposure step, if desired.

More specifically, assume that the operator selects the continuous shoot mode and sets the ABE dial 72 at the "⅓" or "⅔" position. Then, in response to the operation of the release button 22, the system controller 74 corrects the exposure value by a step EV in the positive and negative directions during pickup control. The controller 74 causes a plurality of frames to be picked up in accordance with a desired continuous shoot mode. At this instant, the controller 74 controls the lens opening or the shutter speed ST in order to vary the exposure. Particularly, assume that the exposure time ST is increased due to the variation of the shutter speed, e.g., longer than ¹⁄₃₀ second as in the previous embodiment. Then, the controller 74 uses the double of the exposure time ST as the intervals Δt and so controls the optics driver 34 and CCD driver 36 as to pickup the scene at the intervals Δt. If the exposure time ST is equal to or shorter than ¹⁄₃₀ second, the controller 74 uses the sum of the exposure time ST and ¹⁄₃₀ second as the intervals Δt. The timer 58 feeds timing signals to the controller 74 at the intervals of Δt set by the controller 74. On receiving the timing signal during valid interrupt acceptance period, the controller 74 accepts the timing signal and then executes pickup control while controlling the processing and transfer of the image data.

Figure 15:
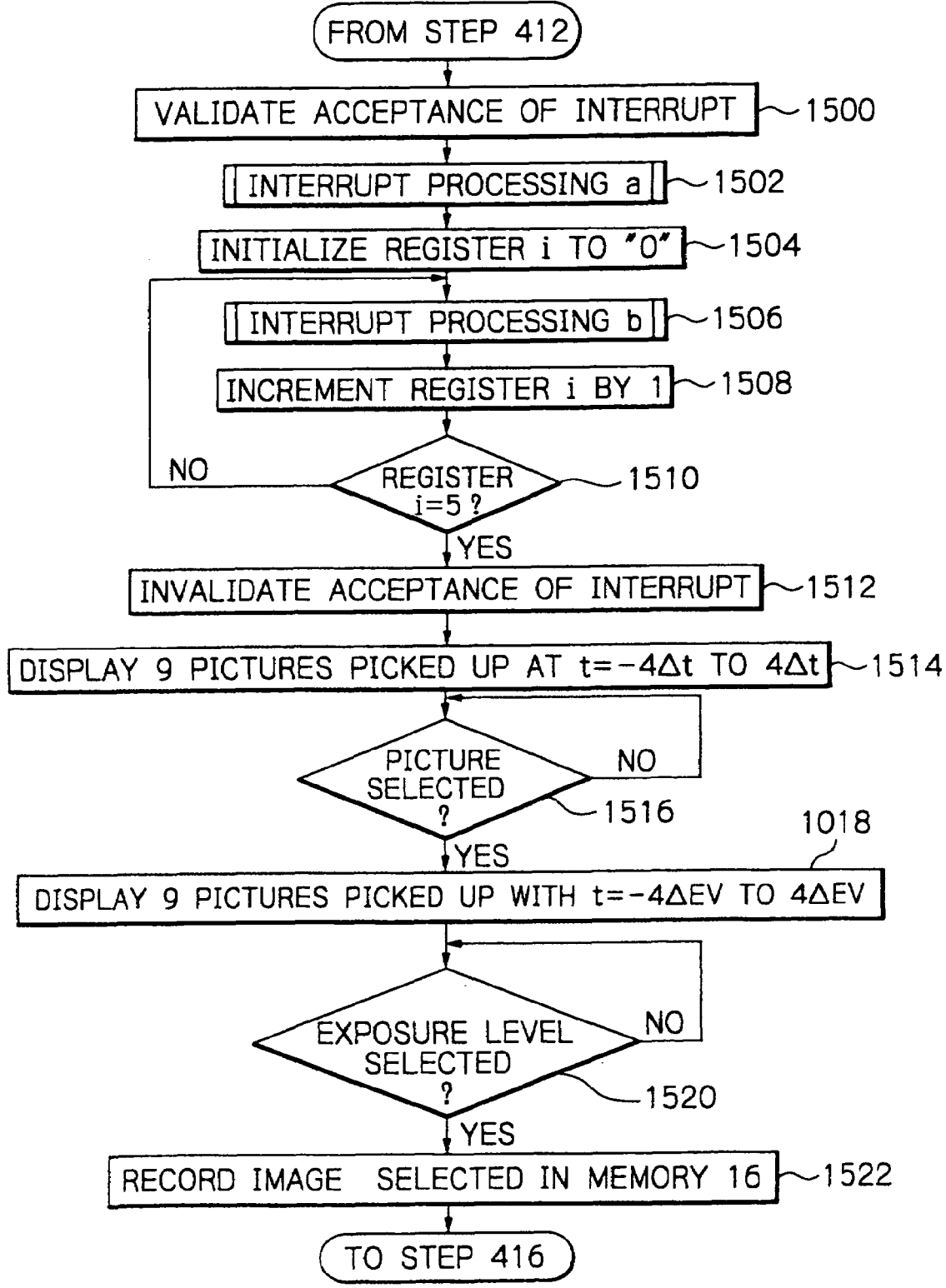
FIG. 15 is a flowchart demonstrating a specific operation of the alternative embodiment executed when the mode dial is set at the "Pre/Post" position.
Figure 16:
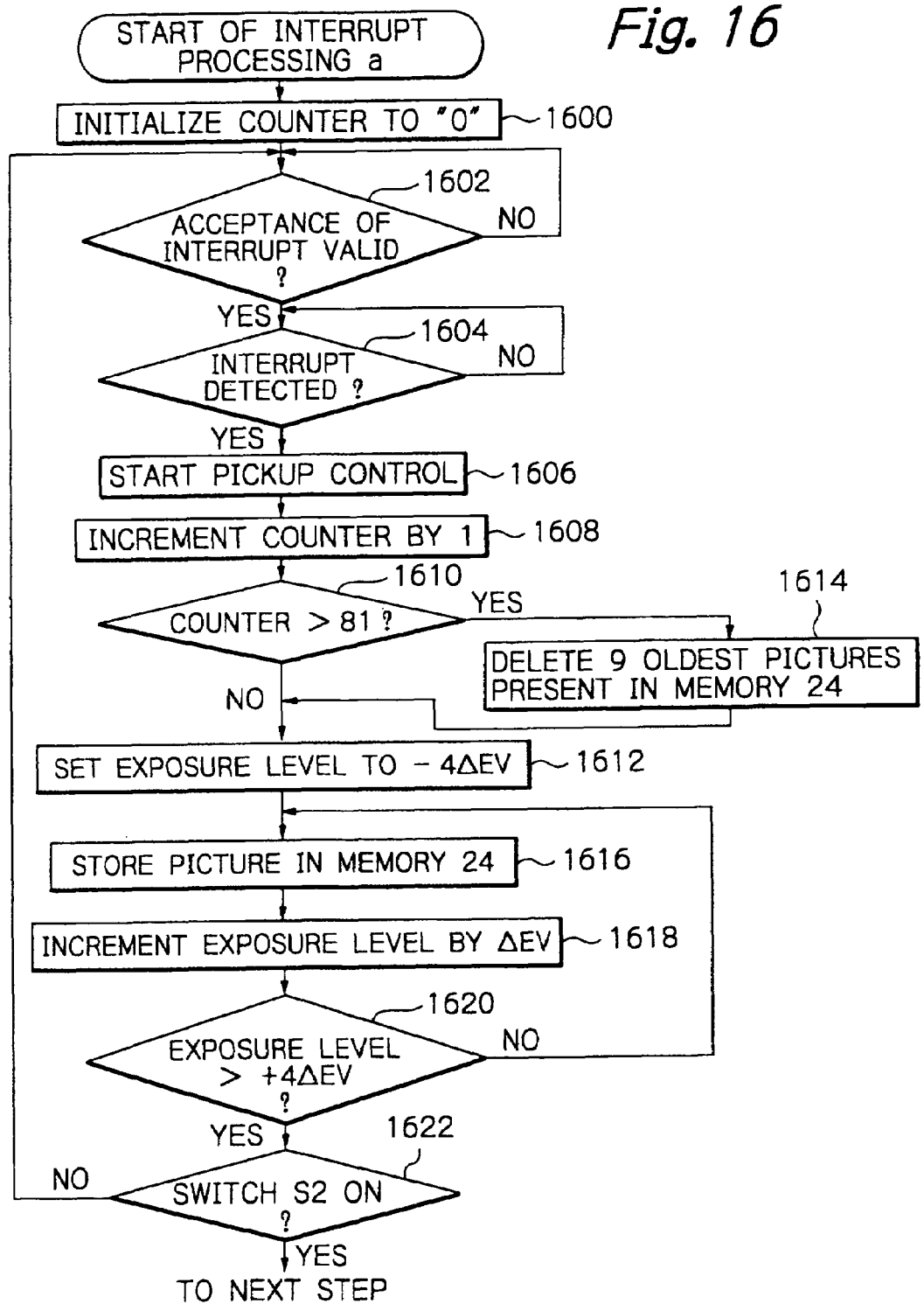
FIGS. 16 and 17 are flowcharts respectively showing interrupt processing a and interrupting processing b included in the procedure of FIG. 15.
Figure 17:
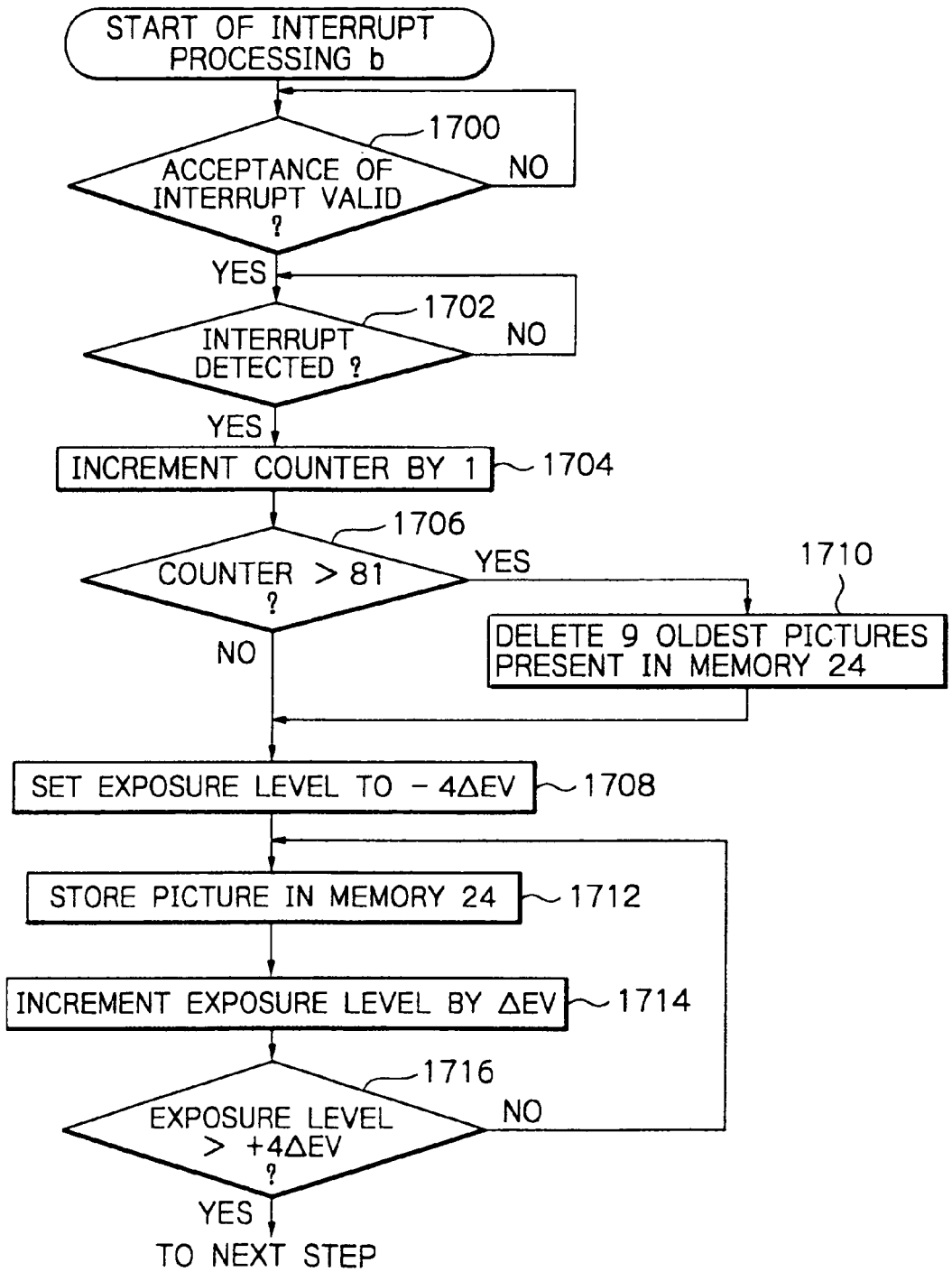

A specific operation of the camera 70, particularly the system controller 74, will be described with reference to FIGS. 15 through 17. The mode dial 20 is assumed to be set at the "Pre/Post" position by way of example. Basically, the system controller 74 also executes the main routine shown in FIG. 4. FIG. 15 shows the step 414 of the main to be executed by the system controller 74. As shown, the controller 74 validates an interrupt due to the timing signal output from the timer 58 (step 1500).

Subsequently, the controller 74 executes interrupt processing a (step 1502). FIG. 16 shows the interrupt processing a specifically. As shown, the controller 74 initializes a counter to "0" (step 1600) and then determines whether or not the acceptance of an interrupt is valid (step 1602). If the answer of the step 1602 is Yes, the controller 74 determines whether or not the timing signal from the timer 58 has been detected as an interrupt signal (step 1604). The controller 74 then starts pickup control (step 1606) and then increments the counter by 1 (step 1608).

After the step 1608, the controller 74 determines whether or not the count of the counter has exceeded "81" (step 1610). If the answer of the step 1610 is No, the controller 74 causes image data generated by the pickup control to be written to the main memory 24 (step 1612). If the answer of the step 1610 is Yes, the controller 74 causes, among the image data stored in the main memory 24, nine oldest image data to be deleted (step 1614). The step 1614 is also followed by the step 1612. In the step 1612, the controller 74 sets −4

ΔEV in an exposure level register and thereby causes the exposure level ΔEV to be corrected by four steps in the negative direction from an adequate exposure value corresponding to photometric data.

Subsequently, the controller 74 causes the camera 70 to pick up the scene with the exposure level of −4 ΔEV and causes the resulting image data to be written to the main memory 24 (step 1616). The controller 74 then adds ΔEV to the value set in the exposure level register (step 1618) and determines whether or not the resulting sum is greater than +4 ΔEV (step 1620). If the answer of the step 1620 is Yes, the controller 74 executes a step 1622. If the answer of the step 1620 is No, the controller 74 returns to the step 1616 and repeats the pickup control and the storage of image data in accordance with the timing signals while maintaining the current exposure value.

In the step 1622, the controller 74 determines whether or not the release switch S2 has been turned on. If the answer of the step 1622 is Yes, the controller 74 executes a step 1504 shown in FIG. 15; if otherwise (No, step 1622), the controller 74 returns to the step 1602. In this manner, eighty-one latest frames of image data are sequentially written to the main memory 24 until the turn-on of the release switch S2 has been detected. At the same time, the oldest image data existing in the main memory 24 are sequentially deleted, so that the image data in the main memory 24 are cyclically updated.

In the step 1504 following the interrupt processing a, the controller 74 initializes the content of the register i to "0". The controller 74 then executes interrupt processing b (step 1506). As shown in FIG. 17 specifically, the interrupt processing b differs from the interrupt processing a of FIG. 16 in that it does not include the steps 1600 and 1622. Steps 1700 through 1716 are executed to pick up the scene at the intervals t while sequentially deleting nine oldest frames stored in the main memory 24. As a result, nine latest frames picked up with different exposure levels are updated.

When the content of the exposure level register exceeds 4 Δ EV (Yes, step 1716), the controller 74 increments the content of the register i by 1 (step 1508, FIG. 15) and determines whether or not the resulting content of the register i is equal to "5" (step 1510). If the answer of the step 1510 is No, the controller 74 repeats the steps 1506 and 1508 until the content of the register i reaches "5". Consequently, 4 (frames)×9 (steps) of frames, i.e., thirty-six frames in total picked up during the interval between the turn-on of the release switch S1 and the turn-on of the release switch S2 are sequentially written to the main memory 24. Thereafter, 5 (frames)×9 (steps) of frames, i.e., forty-five frames in total picked up after the turn-on of the release switch S2 are written to the main memory 24. As a result, eighty-one consecutive frames of image data are stored in the main memory 24.

When the content of the register i reaches "5" (Yes, step 1510), the controller 74 invalidates the acceptance of an interrupt and ends the pickup processing and the storage of image data in the main memory 24 (step 1512). Subsequently, the controller 74 causes the image data picked up at the times t=−4 Δt through t=4 Δt to be read out of the main memory 24. At this instant, in the illustrative embodiment, the digital signal processor 44 transforms the image data picked up at the intervals Δt with the exposure value corresponding to the photometric value, i.e., without any correction (+/−0 EV) to display data. The display data is fed from the signal processor 44 to the LCD driver 56. Consequently, the LCD panel 26 displays the four consecutive frames picked up before the turn-on of the release switch S2 and the five consecutive frames picked up after the turn-on of the release switch S2, i.e., nine consecutive frames in total in a multiframe format (step 1514).

The operator, watching the frames or pictures appearing on the LCD panel 26, selects and enters desired one of the consecutive times t=−4 Δt through t=4 Δt (Yes, step 1516). In response, the controller 74 causes the frames of image data picked up by automatic bracketing and relating to the time Δt selected by the operator to be read out of the main memory 24.

When the above image data blanked at the exposure levels of −4 ΔEV through +4 ΔEV are read out of the main memory 24, they are transformed to corresponding display data and then displayed on the LCD panel 26 in a multiframe format (step 1518). The operator, watching the LCD panel 26, selects desired one of the pictures, i.e., desired one of the various exposure levels (step 1520). In response, the controller 74 causes the image data selected by the operator to be read out of the main memory 24, coded by the compression/expansion circuit 52, and then recorded in the removable memory 16 (step 1522).

After the step 1522, the controller 74 determines whether or not the operator has selected another operation mode or has turned off the power switch 62 (step 416, FIG. 4). The controller 74 then executes the processing described previously with reference to FIG. 4.

As stated above, when the operator sets the mode dial 22 at the "Pre/Post" position and sets the ABE dial 72 at the "⅓" position or the "⅔" position, eighty-one latest frames of image data sequentially picked up with different exposure levels in response to the turn-on of the release switch S1 are written to the main memory 24 while being sequentially updated. On the turn-on of the release switch S2, additional frames of image data are picked up. Consequently, thirty-six frames of image data generated before the turn-on of the release switch S2 and forty-five frames of image data generated after the turn-on of the releases switch S2 are stored in the main memory 24. This allows the operator to select desired one of the eighty-one frames picked up at a particular time.

Again, the image data sequentially generated may be written to the external memory 16, so that needless image data can be deleted. The illustrative embodiment is also practicable even when the mode dial 20 is set at the "Pre" position or the "Post" position.

Figure 18:
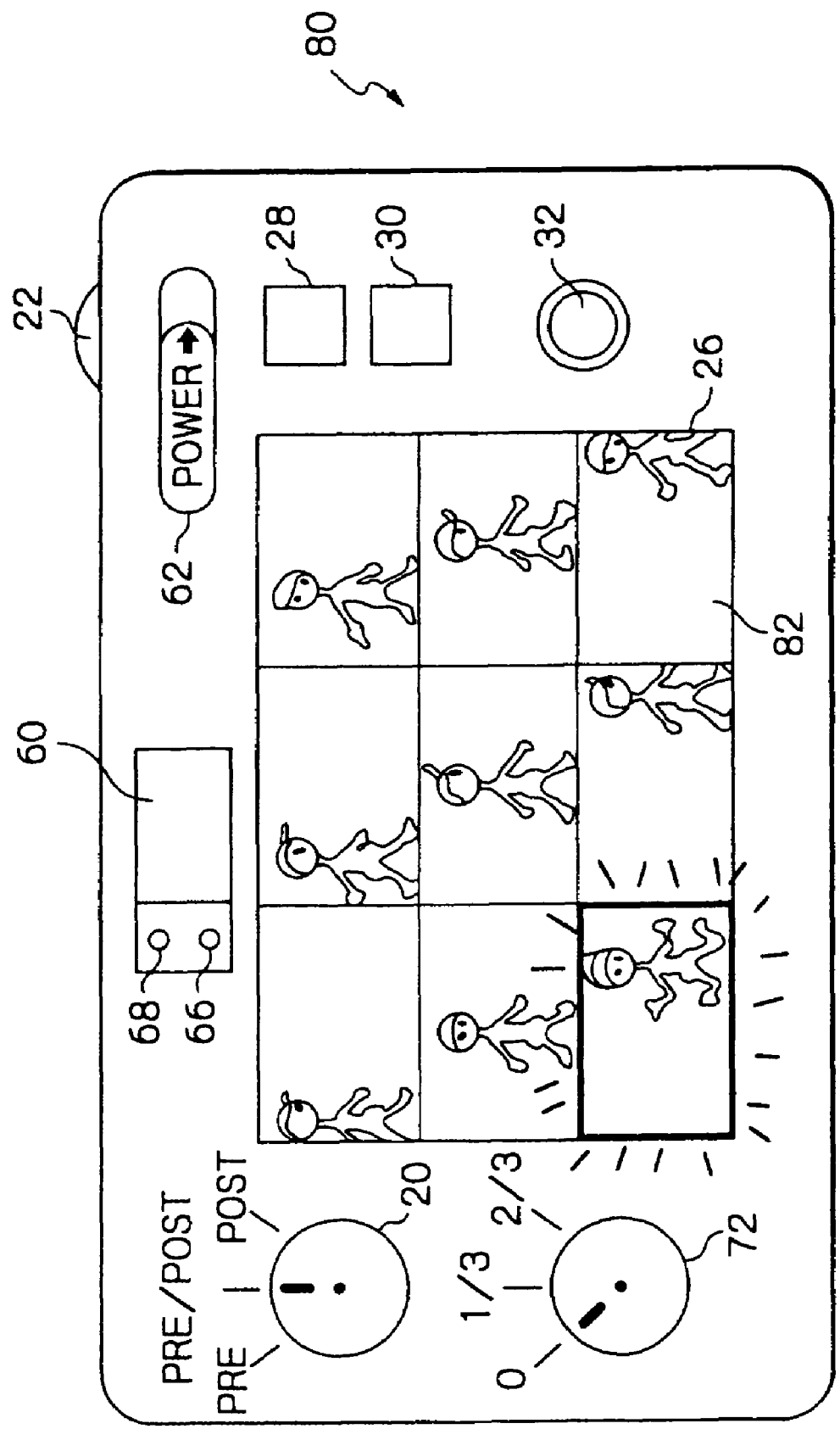
FIG. 18 is an external view showing another alternative embodiment of the present invention.
Figure 19:
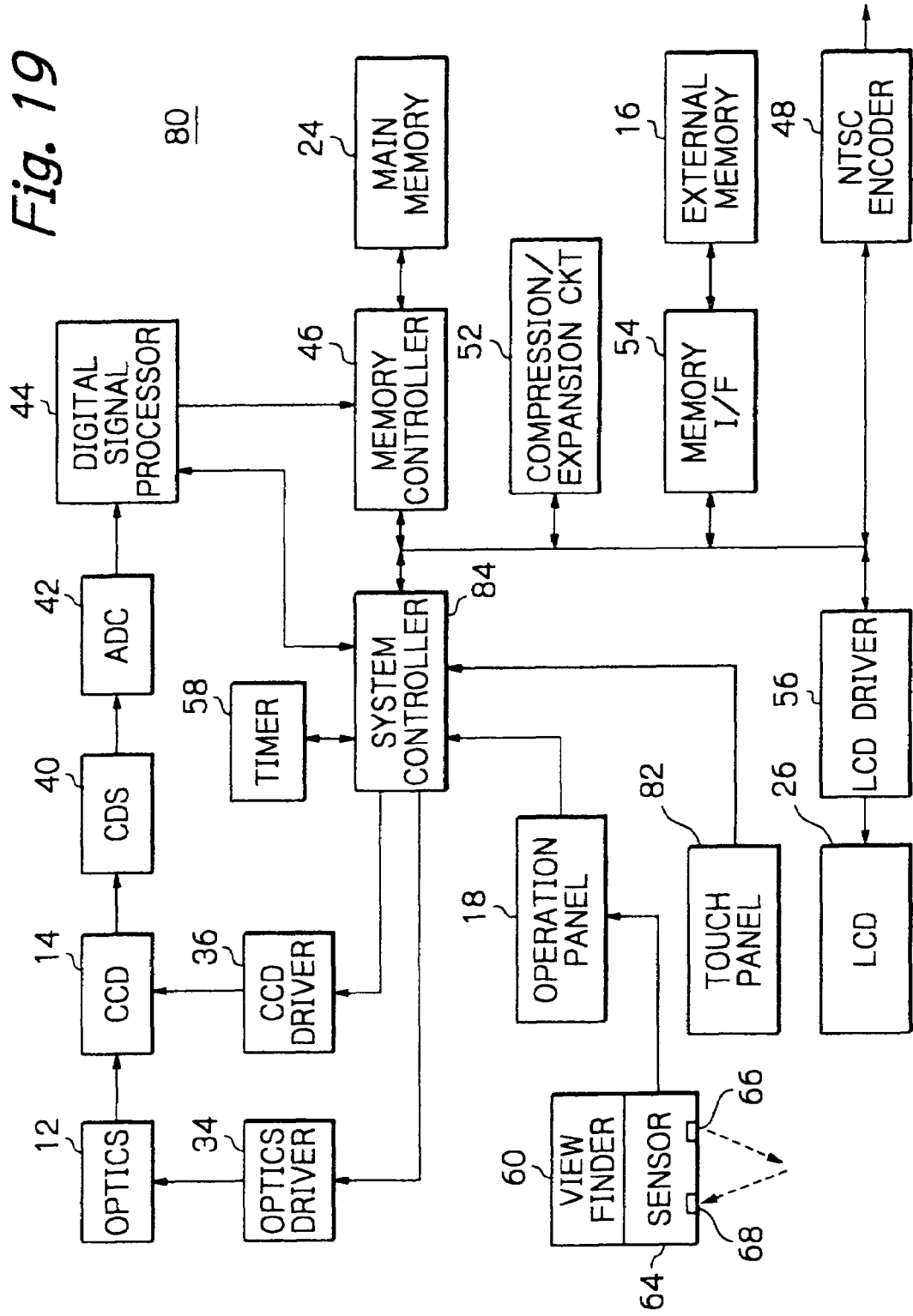
FIG. 19 is a schematic block diagram showing a specific circuit configuration of the embodiment of FIG. 18.

Another alternative embodiment of the present invention will be described with reference to FIGS. 18 and 19. As shown in FIG. 19, a digital camera, generally 80, includes a touch panel 82 in addition to the structural elements of the digital camera 70 described with reference to FIGS. 13 and 14. The touch panel 82 is a pointing device for inputting a bilevel picture. Specifically, the touch panel 82 is superposed on the LCD panel 26 and transparent for pictures appearing on the panel 26. When the operator touches desired part of the touch panel 82, the panel 82 sends coordinates data representative of the coordinates of the touched part to a system controller 84. In the illustrative embodiment, the system controller 84 identifies a bilevel picture corresponding to the coordinates data and determines the degrees of correlation between the bilevel picture and the pictures picked up at the consecutive times. The system controller 84 then distinguishes the picture having a high degree of correlation with the bilevel picture from the other pictures by accentuating it. The system controller 84 has such a composition accentuating function in addition to the functions of the system controller 74, FIG. 14.

Figure 20:
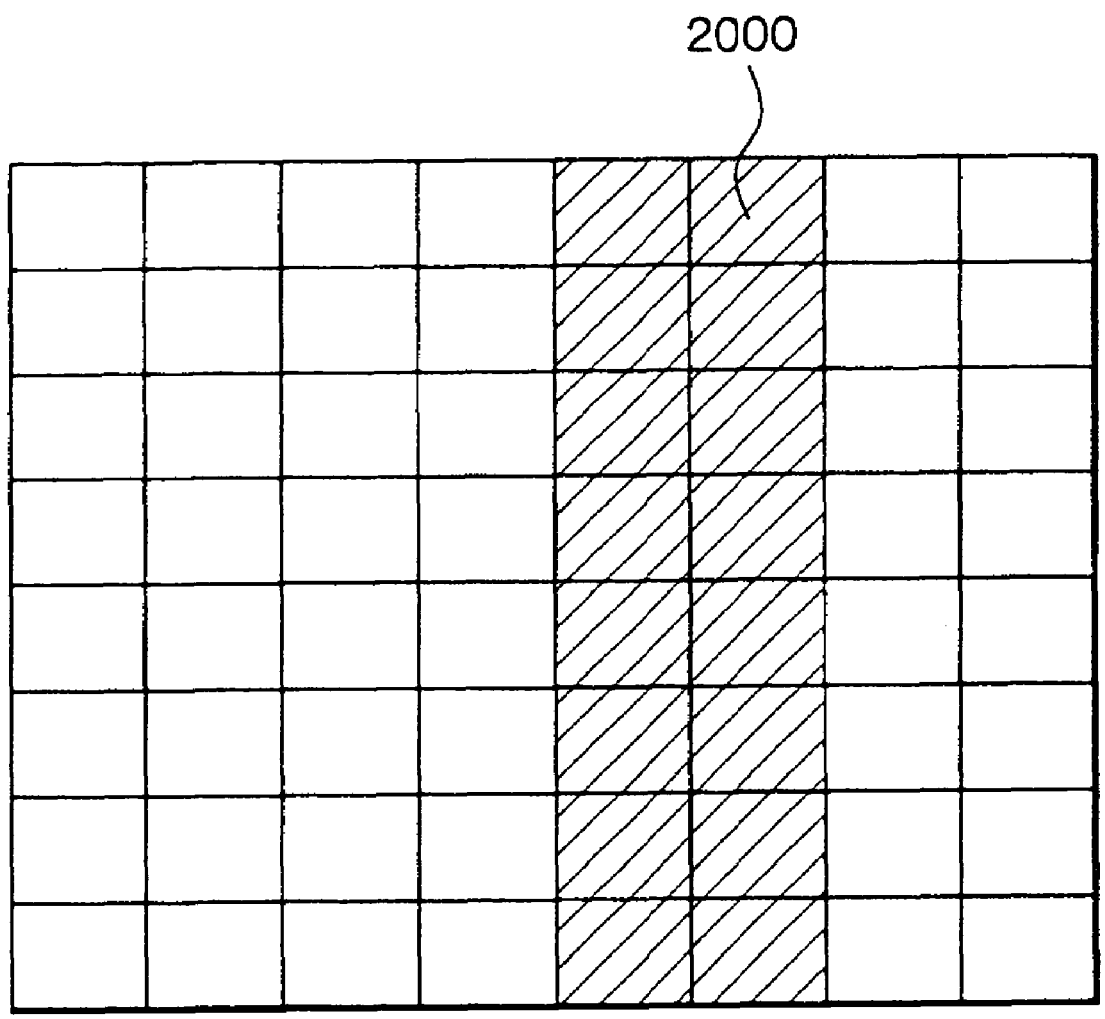
FIG. 20 is a view showing a specific area designated in a frame particular to the embodiment of FIG. 18.

More specifically, as shown in FIG. 20, a frame is divided into sixty-four blocks. The system controller 84 transforms the coordinates data input via the touch panel 82 to a bilevel picture corresponding to the sixty-four blocks and stores data representative of the bilevel picture. The controller 84 then compares, block by block, the bilevel picture and bilevel pictures derived from the image data stored in the main memory 24 to thereby calculate degrees of correlation therebetween. For example, assume that the operator designates an area 2000 indicated by hatching in FIG. 20 on the touch panel 82. Then, the controller 84 causes a bilevel picture corresponding to the designated area 2000 to be stored. When the subject comes into particular part of the picture corresponding to the area 2000, the controller 84 detects a high degree of correlation. Assume that frames shown in FIG. 18 appear on the LCD panel 26 in a multiframe format while the bottom left frame has a high degree of correlation with the area 2000. Then, the controller 84 causes the digital signal processor 44 to accentuate the above particular frame, showing the operator that the accentuated frame corresponds to the bilevel picture designated on the touch panel 82 beforehand.

The controller 84 may cause the image data of the accentuated frame to be processed and automatically recorded in the removable memory 16. Also, the image data input via the touch panel 82 may be written to the main memory 24, external memory 16 or ROM, so that they can be read out at the time of calculation of the degrees of correlation.

Figure 21:
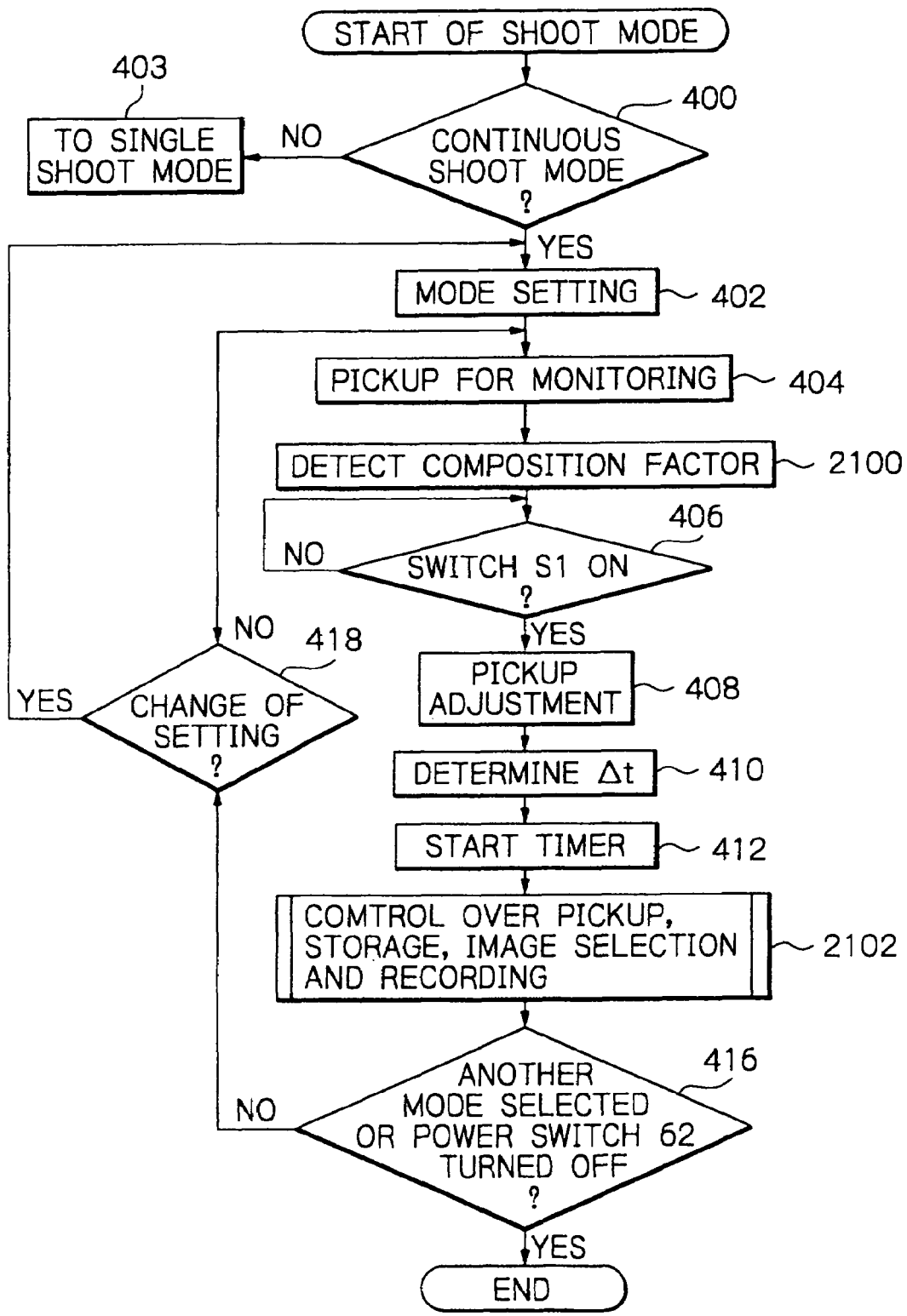
FIG. 21 is a flowchart showing a specific operation of the embodiment of FIG. 18.
Figure 22:
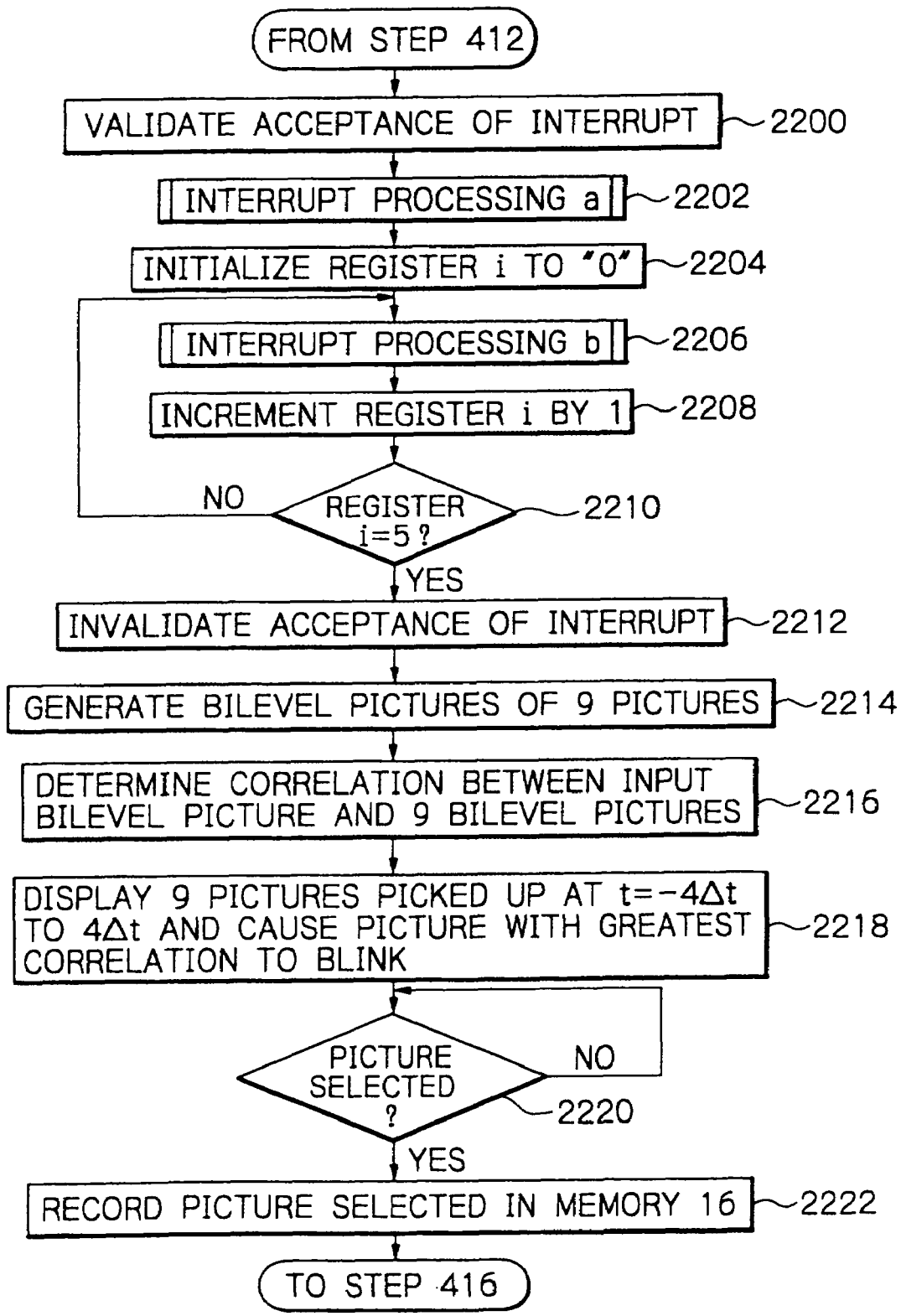
FIG. 22 is a flowchart showing part of the operation of FIG. 21 specifically.

Reference will be made to FIGS. 21 and 22 for describing a specific operation of the digital camera 80. Basically, the main routine described with reference to FIG. 4 also applies to this embodiment. In FIG. 21 showing the main routine, steps identical with the steps shown in FIG. 4 are designated by identical reference numerals and will not be described specifically in order to avoid redundancy. As shown, the system controller 84 detects a bilevel picture as a composition factor based on the operation of the touch panel 82 and causes the resulting bilevel image data to be stored (step 2100). After the step 412, the controller 84 executes a step 2102, which is shown in FIG. 22 in detail. While the following description concentrates on the "Pre/Post" position of the mode dial 20, the procedure of the illustrative embodiment also applies to the "Pre" and "Post" positions.

As shown in FIG. 22, the controller 84 validates the acceptance of an interrupt (step 2200) and then executes interrupt processing a (step 2202). The interrupt processing a may be identical with the processing described with reference to FIG. 6 or 11. Subsequently, the controller 84 initializes the content of the register i to "0" (step 2204) and then executes interrupt processing b (step 2206). The interrupt processing b may be identical with the processing described with reference to FIG. 8 or 12. The controller 84 then increments the content of the register i by 1 (step 2208) and determines whether or not the content of the register i is equal to "5" (step 2210). If the answer of the step 2210 is Yes, the controller 84 invalidates the acceptance of an interrupt (step 2212); if otherwise (No, step 2210) the controller 84 returns to the step 2206.

After the step 2212, the controller 84 causes nine frames of image data stored in the main memory 24 to be converted to corresponding bilevel pictures (step 2214). Subsequently, the controller 84 compares the bilevel pictures and the bilevel picture input via the touch panel 82 block by block so as to calculate a degree of correlation with each of the pictures picked up at a particular time (step 2216). The controller 84, identified image data having the highest degree of correlation, causes display data representative of the nine frames of image data stored in the main memory 24 to be generated. As a result, nine frames or pictures appear on the LCD panel 26 in accordance with the display data (step 2218). At the same time, the controller 84 accentuates the picture having the highest degree of correlation, showing the operator that the picture is closest to the bilevel picture input on the touch panel 82. To accentuate the above frame, the controller 84 may cause the picture to blink or highlight the picture or may vary any attribute of the picture relating to display.

When the operator selects, e.g., the picture distinguished from the other pictures by accentuation (Yes, step 2220), the controller 84 causes the image data representative of the picture selected to be read out of the main memory 24, subjected to YC processing and compression, and then recorded in the memory 16 together with control information (step 2222). In the step 416, FIG. 21, following the step 2222, the controller 84 ends the routine or executes processing matching with a new mode, as in the previous embodiments.

As stated above, the illustrative embodiment allows the operator to easily select one of a plurality of pictures having the highest degree of correlation with a bilevel picture that the operator has input beforehand. A picture picked up at the optical timing can therefore be easily selected and recorded. In addition, the operator can select a picture matching with the bilevel picture in accordance with the position of the subject or the composition. The image data of the picture selected may, of course, be automatically recorded in the removable memory 16. Assume that the operator sets the ABE dial 72 at an other than the "0" position and uses automatic bracketing in combination with the continuous shoot mode. Then, the controller 84 may compare the bilevel picture input via the touch panel 82 and nine frames of image data picked up without exposure correction (+/−0 EV).

The illustrative embodiments shown and described each store, in the continuous shoot mode, a plurality of pictures picked up at preselected intervals in the main memory 24. The operator can therefore select a picture picked up at a desired timing and cause it to be recorded in the external memory 16. Alternatively, the consecutive pictures picked up may be written to the memory 16 and then deleted except for a desired picture.

Pictures picked up before and/or after the turn-on of the release switch S2 are stored in accordance with the position of the mode dial 20, so that the operator can select desired one of the pictures stored. Further, the automatic bracketing function allows the operator to select desired one of pictures subjected to bracketing, as distinguished from pictures subjected to simple automatic exposure. The image data representative of needless pictures may be deleted to prepare for the subsequent shots.

Leaving only the desired picture in the memory 16 is successful to save the capacity of the memory 16. Also, a picture picked up at a desired timing with adequate brightness can be stored in the memory 16. When a device for inputting a bilevel picture is available, it is possible to accentuate a picture having the highest degree of correlation with the bilevel picture in order to distinguish it from the other pictures. The operator can therefore easily select a picture corresponding in composition to the bilevel picture.

In summary, in accordance with the present invention, an image pickup apparatus includes storing means for storing, among consecutive frames picked up at preselected intervals, a preselected number of frames while sequentially updating them. The frames picked up before and/or after the turn-on of a release switch are written to the storing means in accordance with a mode selected by the operator. The operator can therefore select one of the frames picked up at a desired timing and stored in the storing means. For the same purpose, an external memory or similar removable recording medium may be so controlled as to delete the frames other the desired frame. By using automatic bracketing, it is possible to leave in the recording medium a frame picked up at an adequate timing with an adequate exposure level.

The entire disclosure of Japanese patent application No. 259867/1999 filed Sep. 14, 1999 including the specification, claims, accompanying drawings and abstract of the disclosure is incorporated herein by reference in its entirety.

While the present invention has been described with reference to the illustrative embodiments, it is not to be restricted by the embodiments. It is to be a appreciated that those skilled in the art can change or modify the embodiments without departing from the scope and spirit of the present invention.

What is claimed is:

1. An image pickup apparatus, comprising:
   an image sensor for picking up a scene in response to a control signal to thereby output an image signal representative of said scene;
   a recording device for recording a plurality of frames of image signals;
   a selecting device for allowing an operator of said image pickup apparatus to select a desired one of the plurality of frames of image signals recorded in said recording device; and
   a controller operative in response to said selecting device for outputting the control signal to cause said image sensor to pick up the scene at preselected intervals and for controlling said recording device,
   wherein said controller sets a period of time corresponding to a photometric value as the preselected intervals,
   wherein said recording device records latest ones of a plurality of frames of image signals picked up at the preselected intervals while sequentially updating said plurality of latest frames of image signals,
   wherein said controller causes said recording device to hold frames of image signals picked up during a period of time based on a release operation, and causes non-selected frames of image signals, as distinguished from the one frame of image signal selected, existing in said recording device to be automatically deleted, such that only the selected one frame of image signal is maintained, wherein to set the period of time corresponding to the photometric value as the preselected intervals, said controller is configured to
   determine a shutter time of a shutter based on the photometric value, and
   set the period of time to be equal to or longer than a sum of the shutter time and a frame transfer time,
   wherein the frame transfer time is a period of time necessary to transfer one frame of pixel signals from said image sensor to said recording device.

2. An apparatus in accordance with claim 1, wherein said controller comprises a mode setting circuit for allowing the operator to set a mode that causes said recording device to hold the frames of image signals picked up during the period of time at least before or after the release operation, whereby the frames of image signals are recorded in said recording device in accordance with said mode.

3. An apparatus in accordance with claim 2, wherein when the operator sets a "Pre" mode for causing said recording device to hold the frames of image signals picked up before the release operation, said controller causes said recording device to hold the frames of image signals picked up at least before the release operation.

4. An apparatus in accordance with claim 2, wherein when the operator sets a "Post" mode for causing said recording device to hold the frames of image signals picked up after the release operation, said controller causes said recording device to hold the frames of image signals picked up at least after the release operation.

5. An apparatus in accordance with claim 2, wherein when the operator sets a "Pre/Post" mode for causing said recording device to hold the frames of image signals picked up before and after the release operation, said controller causes said recording device to hold the frames of image signals picked up before and after the release operation.

6. An apparatus in accordance with claim 1, further comprising a display for displaying pictures represented by the frames of image signals recorded in said recording device, wherein said controller causes a picture represented by the one frame of image signal selected to be distinguished from the other pictures on said display.

7. An apparatus in accordance with claim 6, wherein said controller causes said display to display the pictures together in a preselected format.

8. An apparatus in accordance with claim 2, further comprising a switch circuit for generating first information and second information in response to a first release operation and a second release operation, respectively, wherein said controller controls, in response to said first information, said image sensor and said recording device for executing pickup control at the preselected intervals and recording resulting frames of image signals in said recording device and then causes, in response to said second information and in accordance with the mode set by the operator, said recording device to hold the frames of image signals existing therein.

9. An apparatus in accordance with claim 8, wherein said switch circuit generates the first information when the operator presses a release button to a half-stroke position and then generates the second information when the operator presses said release button to a full-stroke position.

10. An apparatus in accordance with clam 8, wherein said switch circuit comprises a sensor for generating the first information when the operator holds said apparatus in a position ready to shoot the scene.

11. An apparatus in accordance with claim 1, further comprising a signal generating circuit for generating timing signals at the preselected intervals under control of said controller, wherein said controller executes the pickup control over said image sensor and storage control over said recording device at said preselected intervals for thereby causing the frames of image signals picked up at said intervals to be written to said recording device.

12. An apparatus in accordance with claim 1, wherein said controller further executes, when executing the pickup control by controlling said image sensor, control for correcting exposure in a plurality of steps, wherein said recording device records latest ones of the plurality of frames of image signals picked up at the preselected intervals and corrected in exposure in said plurality of steps while sequentially updating said latest frames of image signals, and wherein said selecting device allows the operator to select a desired one of image data including image data corrected in exposure in said plurality of steps.

13. An apparatus in accordance with claim 1, further comprising a bilevel image data generating device for generating bilevel image data representative of a bilevel picture to be compared with pictures represented by the plurality of frames of image signals existing in said recording device with respect to a correlation, wherein said controller determines a correlation between each of said pictures and said bilevel picture, and wherein said selecting device allows the operator to select a frame of image data having a high degree of correlation as determined by said controller.

14. An apparatus in accordance with claim 13, wherein said controller transforms each of the frames of signals recorded in said recording device to bilevel image data and compares said bilevel image data and the bilevel image data output from said bilevel image data generating device to thereby determine the correlation.

15. An apparatus in accordance with claim 14, wherein said controller causes the frame of image data having the high degree of correlation to be distinguished from the other frames of image data at the time of display.

16. An apparatus in accordance with claim 13, wherein said controller further executes, when executing the pickup control by controlling said image sensor, control for correcting exposure in a plurality of steps, wherein said recording device records, among the plurality of frames of image signals picked up at the preselected intervals and corrected in exposure in said plurality of steps, a plurality of latest frames of image signals while sequentially updating said plurality of latest frames of image signals, and wherein said selecting device allows the operator to select a desired one of image data including image data corrected in exposure in said plurality of steps.

17. An apparatus in accordance with claim 13, wherein said controller transforms the image data picked up at the preselected intervals without the exposure correction and recorded in said recording device to bilevel image data and compares said bilevel image data and the bilevel image data output from said bilevel image data generating device.

18. An apparatus in accordance with claim 1, wherein said controller is configured to determine whether the shutter time is faster or equal to the frame transfer time, set the period of time to be equal to the sum of the shutter time and the frame transfer time when the controller determines that the shutter time is faster or equal to the frame transfer time, and set the period of time to be equal to a multiple of the shutter time when the controller determines that the shutter time is slower than the frame transfer time, wherein the multiple is at least 2.

* * * * *